United States Patent
Shono et al.

(10) Patent No.: US 6,219,601 B1
(45) Date of Patent: Apr. 17, 2001

(54) VEHICLE HEIGHT ADJUST CONTROL APPARATUS AND METHOD

(75) Inventors: Shoichi Shono, Nishikamo-gun; Yoshiyuki Hashimoto, Anjo; Masaaki Tabata, Chiryu; Kenji Harada, Toyota; Atushi Sato, Susono; Masaki Kanatani, Okazaki, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/166,076

(22) Filed: Oct. 5, 1998

(30) Foreign Application Priority Data

Jan. 16, 1998 (JP) .................................. 10-006946

(51) Int. Cl.$^7$ .................................................. B60G 17/00
(52) U.S. Cl. .............................. 701/37; 701/36; 701/38; 701/39
(58) Field of Search ........................ 701/36, 37, 38, 701/39; 280/5 T; 364/424.05

(56) References Cited

U.S. PATENT DOCUMENTS

| | | | | |
|---|---|---|---|---|
| 4,076,275 | * | 2/1978 | Hiruma | 280/124 F |
| 4,462,610 | * | 7/1984 | Saito et al. | 280/707 |
| 4,593,931 | * | 6/1986 | Shiratori et al. | 280/714 |
| 4,738,330 | * | 4/1988 | Suzuki et al. | 180/141 |
| 4,749,239 | * | 6/1988 | Onogi et al. | 303/95 |
| 4,765,649 | * | 8/1988 | Ikemoto et al. | 280/707 |
| 5,014,199 | * | 5/1991 | Konishi et al. | 364/424.05 |
| 5,047,938 | * | 9/1991 | Yokote et al. | 364/424.05 |
| 5,083,275 | * | 1/1992 | Kawagoe et al. | 364/424.05 |
| 5,088,761 | * | 2/1992 | Takehara et al. | 280/707 |
| 5,162,995 | * | 11/1992 | Ikemoto et al. | 364/424.05 |
| 5,199,854 | * | 4/1993 | Aoyama | 417/282 |
| 5,217,247 | * | 6/1993 | Nezu et al. | 280/707 |
| 5,220,505 | * | 6/1993 | Yokote et al. | 364/424.05 |
| 5,251,134 | * | 10/1993 | Takehara et al. | 364/424.05 |
| 5,251,929 | * | 10/1993 | Kawabata | 280/707 |
| 5,579,229 | * | 11/1996 | Maguran, Jr. | 364/424.05 |
| 5,855,379 | * | 1/1999 | Buma et al. | 280/5.514 |

FOREIGN PATENT DOCUMENTS

| | | |
|---|---|---|
| 57-202309 | 6/1981 | (JP) . |
| 63-269713 | 4/1987 | (JP) . |
| 2-3515 | 2/1988 | (JP) . |
| 2-136318 | 5/1990 | (JP) . |
| 5-178056 | 12/1991 | (JP) . |

* cited by examiner

Primary Examiner—William A. Cuchlinski, Jr.
Assistant Examiner—Marthe Y. Marc-Coleman
(74) Attorney, Agent, or Firm—Oliff & Berridge, PLC

(57) ABSTRACT

A vehicle height adjust control apparatus and method adjusts an actual vehicle height to a target vehicle height using a microcomputer that controls an electric motor, leveling valves and an accumulator valve on the basis of the actual vehicle height detected by vehicle height sensors, so as to eliminate any deviation of the actual vehicle height from the target vehicle height. If a hydraulic fluid temperature detected by a fluid temperature sensor is very low or very high, the microcomputer suspends the vehicle height adjusting control and the supply of hydraulic fluid to an accumulator by stopping the operation of the electric motor and a hydraulic pump and/or switching the valves to a closed state. The suspending control thereby prevents very high and low viscosities of the hydraulic fluid, or very low and high fluidities thereof, which prevent an undesirable increase of the load on the hydraulic pump and an undesirable decrease of the ejecting performance thereof.

7 Claims, 14 Drawing Sheets

VEHICLE HEIGHT ADJUST CONTROL APPARATUS AND METHOD

INCORPORATION BY REFERENCE

The disclosure of Japanese Patent Application No. HEI 10-6946 filed on Jan. 16, 1998 including the specification, drawings and abstract is incorporated herein by reference in its entirety.

BACKGROUND OF THE INVENTION

1. Field of Invention

The present invention relates to a vehicle height adjust control apparatus and method for setting a vehicle height to a target vehicle height by supplying hydraulic fluid to and discharging it from hydraulic actuators provided between a vehicle body and wheels.

2. Description of Related Art

A vehicle height adjust control apparatus described in Japanese Patent Application Laid-Open No. Hei 2-3515, for example, includes a hydraulic actuator for changing a vehicle height by hydraulic fluid supplied and discharged, a supply-discharge device made up of a hydraulic pump, a control valve for supplying hydraulic fluid into and discharging it from the hydraulic actuator, a vehicle height detection device for detecting an actual vehicle height, and a supply-discharge control device for controlling the operation of the supply-discharge device so as to eliminate deviation of the detected actual vehicle height from a predetermined target vehicle height. The apparatus controls and sets the actual vehicle height to a target vehicle height by supplying hydraulic fluid to and discharging it from the hydraulic actuator using the supply-discharge device.

In this vehicle height adjust control apparatus, various problems occur depending on various factors, such as the construction of the hydraulic pump or the control valve, the control of the supply-discharge device by the supply-discharge control device, the condition of the hydraulic fluid, the condition of a battery, and the like. Specifically, if the hydraulic pump is operated at a very low hydraulic fluid temperature, an excessively great load is caused on the hydraulic pump. This adversely affects the durability of the hydraulic pump because at a very low temperature the fluidity of hydraulic fluid is very low and the viscosity thereof is very high. At a very high hydraulic fluid temperature, the viscosity of hydraulic fluid becomes very low, so that the ejecting performance of the hydraulic pump decreases. Therefore, it becomes necessary to operate the hydraulic pump for longer periods. Long-time operation of the hydraulic pump further increases the hydraulic fluid temperature, thereby adversely affecting the durability of the hydraulic pump. This temperature-dependent problem is significant, particularly if the hydraulic pump is a gear pump.

If stopping of the hydraulic pump and switching of the control valve from a open state to an close state are simultaneously performed to stop the supply of hydraulic fluid from the hydraulic pump to the hydraulic actuator, hydraulic fluid may impact the control valve because the hydraulic pump will not immediately stop ejecting hydraulic fluid, due to the inertia of an electrical motor or the like. Such impact on the control valve produces impact noise and degrades the durability of the hydraulic system, including the hydraulic pump, the control valve and the like. This problem becomes more significant if the hydraulic fluid temperature is lower and the hydraulic fluid viscosity is higher, and if the hydraulic fluid ejecting pressure produced by the hydraulic pump is higher.

If the control valve is an electromagnetic on-off valve, a size reduction of the control valve results in a reduction in the number of turns of the coil, so that it may become difficult for the coil to provide a sufficiently great attraction force for drawing a plunger. Furthermore, since a temperature increase correspondingly increases the resistance of the coil, the coil may not be provided with a current sufficient to attract the plunger if the hydraulic fluid temperature is high. In addition, an insufficient current through the coil for attracting the plunger also results from a voltage reduction of the battery that energizes the coil.

SUMMARY OF THE INVENTION

Accordingly, it is an object of the invention to improve the durability of a vehicle height adjust control apparatus and ensure reliable operation of the apparatus by solving the aforementioned various problems of the conventional art.

According to a first aspect of the invention, there is provided a vehicle height adjust control apparatus including a hydraulic actuator capable of increasing and reducing a vehicle height using hydraulic fluid, and a hydraulic pump for ejecting hydraulic fluid. The vehicle height adjust control apparatus further includes a supply/discharge device for enabling the supplying of the hydraulic fluid to the hydraulic actuator and the discharging of the hydraulic fluid from the hydraulic actuator, a vehicle height detection device for detecting a vehicle height, a supply/discharge control device for controlling operation of the supply/discharge device so as to eliminate a deviation of the vehicle height detected by the vehicle height detection device from a predetermined target vehicle height, a fluid temperature detection device for detecting a temperature of the hydraulic fluid, and a suspending control device for suspending control of the operation of the supply/discharge device by the supply/discharge control device if the temperature of the hydraulic fluid detected by the fluid temperature detection device is equal to or lower than a first predetermined temperature or equal to or higher than a second predetermined temperature.

If the temperature of the hydraulic fluid is equal to or lower than the first predetermined temperature or equal to or higher than the second predetermined temperature, the operation of the supply/discharge device, including the hydraulic pump, is stopped by the suspending control device. Therefore, by suitably setting the first and second predetermined temperatures, the operation of the hydraulic pump provided in the supply/discharge device will be stopped if the temperature of the hydraulic fluid becomes very low or very high (or if the viscosity of the hydraulic fluid becomes very high or very low so that the fluidity thereof is very low or very high). Therefore, the durability or service life of the supply/discharge device, including the hydraulic pump, is increased.

According to another aspect of the invention, there is provided a vehicle height adjust control apparatus including a hydraulic pump for ejecting hydraulic fluid into a supply/discharge device, an accumulator for accumulating hydraulic fluid ejected by the hydraulic pump, a fluid temperature detection device for detecting a temperature of the hydraulic fluid, and a suspending control device for suspending the supplying of the hydraulic fluid from the hydraulic pump to the accumulator if the temperature of the hydraulic fluid detected by the fluid temperature detection device is equal to or lower than a first predetermined temperature or equal to or higher than a second predetermined temperature. Therefore, if the temperature of the hydraulic fluid is equal to or lower than the first predetermined temperature or equal to or higher than the second predetermined temperature, the operation of the hydraulic pump for supplying the hydraulic fluid to the accumulator is stopped by the suspending control device. Consequently, by suitably setting the first and second predetermined temperatures, the durability or service life of the supply/discharge device, including the hydraulic pump and the accumulator, is increased, as in the construction described above.

According to still another aspect of the invention, there is provided a vehicle height adjust control apparatus including a hydraulic actuator capable of increasing and reducing a vehicle height using hydraulic fluid, and a hydraulic pump for ejecting the hydraulic fluid. The apparatus further includes a control valve provided in a fluid passage between the hydraulic pump and the hydraulic actuator, for opening and closing the fluid passage, a vehicle height detection device for detecting a vehicle height, a supply/discharge control device for controlling operation of the hydraulic pump and the opening and closing of the control valve so as to eliminate a deviation of the vehicle height detected by the vehicle height detection device from a predetermined target vehicle height, and a delay control device provided in the supply/discharge control device for outputting an instruction to switch the control valve from the open state to the closed state, at the elapse of a predetermined delay time following output of an instruction to switch the hydraulic pump from the operating state to the stopped state. The delay control device operates when the hydraulic pump is switched from an operating state to a stopped state and the control valve is to be switched from an open state to a closed state. Therefore, if the hydraulic pump does not stop ejecting the hydraulic fluid immediately after the instruction to stop the hydraulic pump, due to the inertia of the electric motor or the like, the vehicle height adjust control apparatus is able to switch the control valve from the open state to the closed state after the ejection of hydraulic fluid from the hydraulic pump has substantially stopped. Therefore, impact on the control valve by the hydraulic fluid is reduced, so that impact noise caused thereby will be considerably reduced, and so that degradation of the durability of a hydraulic system, including the hydraulic pump, the control valve and the like, can be substantially prevented.

The vehicle height adjust control apparatus according to this aspect may also include a fluid temperature detection device for detecting a temperature of the hydraulic fluid, and a delay time correction device provided in the supply/discharge control device, for increasing the predetermined delay time with a decrease in the temperature of the hydraulic fluid detected by the fluid temperature detection device. With this construction, if the temperature of the hydraulic fluid is low, so that the viscosity thereof is high and the impact of the hydraulic fluid on the control valve will be great, the time from the output of the instruction to stop the hydraulic pump to the output of the instruction to switch the control valve from the open state to the closed state is increased so that the impact of the hydraulic fluid on the control valve is favorably reduced. Therefore, the vehicle height adjust control apparatus precisely reduces impact noise without unnecessarily delaying the switching of the control valve from the open state to the closed state if the temperature of the hydraulic fluid changes. As a result, it becomes possible to precisely prevent or minimize deterioration of the durability of a hydraulic system, including the hydraulic pump, the control valve and the like, that is caused by impact of hydraulic fluid thereon.

The vehicle height adjust control apparatus may also include a hydraulic pressure detection device for detecting a pressure of the hydraulic fluid supplied from the hydraulic pump to the hydraulic actuator, and a delay time correction device provided in the supply/discharge control device, for increasing the predetermined delay time with an increase in the pressure of the hydraulic fluid detected by the hydraulic pressure detection device. With this construction, if the pressure of the hydraulic fluid ejected by the hydraulic pump is high, so that the impact of the hydraulic fluid on the control valve will be great, the time from the output of the instruction to stop the hydraulic pump to the output of the instruction to switch the control valve from the open state to the closed state is increased so that the impact of the hydraulic fluid on the control valve is favorably reduced. Therefore, the vehicle height adjust control apparatus precisely reduces impact noise without unnecessarily delaying the switching of the control valve from the open state to the closed state if the ejecting pressure of the hydraulic pump changes. As a result, it becomes possible to precisely prevent or minimize deterioration of the durability of a hydraulic system, including the hydraulic pump, the control valve and the like, that is caused by impact of hydraulic fluid thereon.

According to a further aspect of the invention, there is provided a vehicle height adjust control apparatus including a hydraulic actuator capable of increasing and reducing a vehicle height using hydraulic fluid, and a supply/discharge device for enabling the supplying of the hydraulic fluid to the hydraulic actuator and the discharging of the hydraulic fluid from the hydraulic actuator. The supply/discharge device has an electromagnetic on-off valve for controlling passage of the hydraulic fluid. The vehicle height adjust control apparatus further includes a vehicle height detection device for detecting a vehicle height, a supply/discharge control device for controlling operation of the supply/discharge device so as to eliminate a deviation of the vehicle height detected by the vehicle height detection device from a predetermined target vehicle height, and a duty ratio control device provided in the supply/discharge control device for controlling a duty ratio. The duty ratio control device may set the duty ratio of voltage applied to the electromagnetic on-off valve, immediately after voltage application thereto is started, to a ratio that is greater than the duty ratio of voltage applied afterwards. Therefore, a great current flows through the coil of the electromagnetic on-off valve during a period immediately after the start of application of voltage thereto, during which a large attraction force is needed to move the plunger of the electromagnetic on-off valve. During a subsequent period when only a small attraction force is needed to retain the plunger at a predetermined position, a small current flows through the coil. Consequently, it becomes possible to ensure precise operation of the electromagnetic on-off valve while minimizing power consumption.

The vehicle height adjust control apparatus according to this aspect of the invention may further include a fluid temperature detection device for detecting a temperature of the hydraulic fluid, wherein the duty ratio control device increases the duty ratio of voltage applied to the electromagnetic on-off valve with an increase in the temperature of the hydraulic fluid detected by the fluid temperature detection device. With this construction, it becomes possible to ensure sufficient current through the coil of the electromagnetic on-off valve needed to attract the plunger even if the temperature of the coil increases so that the resistance of the coil increases. Therefore, the vehicle height adjust control apparatus is able to prevent malfunction of the electromagnetic on-off valve due to temperature changes and therefore ensure precise operation of the electromagnetic on-off valve.

The duty ratio control device may also increase the duty ratio of voltage applied to the electromagnetic on-off valve with a decrease in output voltage of a battery provided for applying voltage to the electromagnetic on-off valve. With this construction, it becomes possible to ensure sufficient current through the coil of the electromagnetic on-off valve needed to attract the plunger even if the output voltage of the battery decreases. Therefore, the vehicle height adjust control apparatus is able to prevent malfunction of the electromagnetic on-off valve due to changes in the battery voltage and therefore ensure precise operation of the electromagnetic on-off valve.

According to a further aspect of the invention, there is provided a method of adjusting vehicle height, comprising: providing a hydraulic actuator capable of increasing and reducing a vehicle height using hydraulic fluid; supplying and discharging the hydraulic fluid to and from the hydraulic actuator; detecting a vehicle height; detecting a temperature of the hydraulic fluid; controlling operation of the supplying and discharging of hydraulic fluid to and from the hydraulic actuator so as to eliminate a deviation of the detected vehicle height from a predetermined target vehicle height; and suspending operation of the supplying and discharging of hydraulic fluid if the detected temperature of the hydraulic fluid is either equal to or lower than a first predetermined temperature or equal to or higher than a second predetermined temperature.

According to yet another aspect of the invention, there is provided a method of adjusting vehicle height, comprising: providing a hydraulic actuator that increases and decreases a vehicle height using hydraulic fluid; providing a hydraulic pump that ejects the hydraulic fluid into the hydraulic actuator; providing a control valve in a fluid passage between the hydraulic pump and the hydraulic actuator that opens and closes the fluid passage; detecting a vehicle height; controlling operation of the hydraulic pump and the opening and closing of the control valve so as to eliminate a deviation of the detected vehicle height from a predetermined target vehicle height; and delaying the switching of the control valve from an open state to a closed state until after lapse of a predetermined delay time following an instruction to switch the hydraulic pump from an operating state to a stopped state.

BRIEF DESCRIPTION OF THE DRAWINGS

The foregoing and further objects, features and advantages of the present invention will become apparent from the following description of a preferred embodiment with reference to the accompanying drawings, wherein like numerals are used to represent like elements and wherein.

DETAILED DESCRIPTION OF PREFERRED EMBODIMENTS

A preferred embodiment of the present invention will be described in detail hereinafter with reference to the accompanying drawings.

Figure 1:
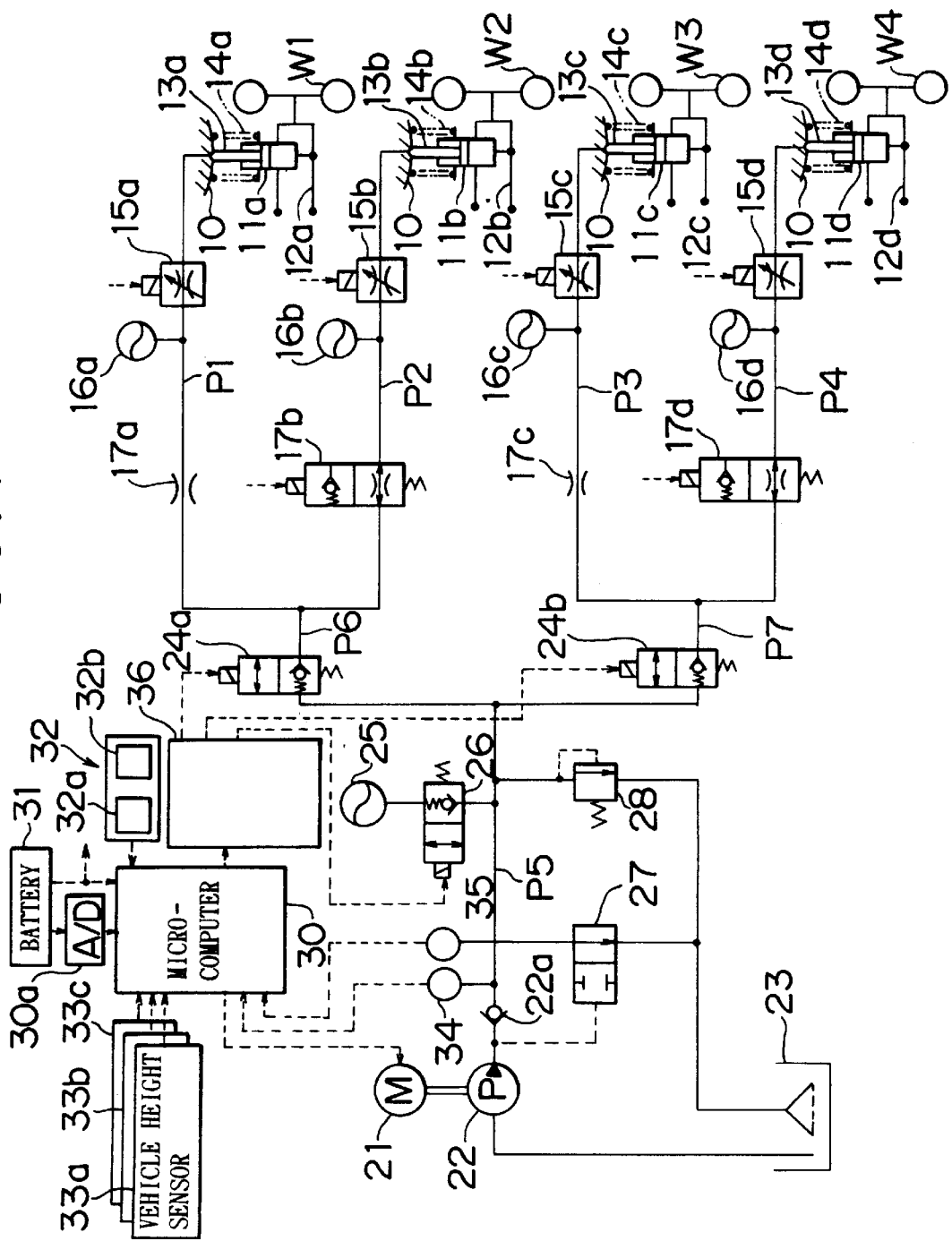
FIG. 1 is a schematic diagram of a vehicle height adjust control apparatus according to an embodiment of the invention.

FIG. 1 is a schematic illustration of the entire vehicle height adjust control apparatus according to an embodiment of the invention.

The vehicle height adjust control apparatus has hydraulic cylinders 11a–11d that form hydraulic actuators for setting vehicle heights, near left and right front wheels W1, W2 and left and right rear wheels W3, W4, respectively. Each of the hydraulic cylinders 11a–11d is connected at its lower end to a lower arm 12a–12d connecting to the corresponding one of the wheels W1–W4. A piston rod 13a–13d of each hydraulic cylinder 11a–11d protrudes from an upper surface thereof. Upper end portions of the piston rods 13a–13d are fixed to a vehicle body 10. Hydraulic fluid is supplied to and discharged from the hydraulic cylinders 11a–11d through fluid passages P1–P4, respectively. In accordance with supply and discharge of hydraulic fluid, the hydraulic cylinders 11a–11d change the vehicle heights at the respective wheel positions.

Coil springs 14a–14d are disposed between the vehicle body 10 and the hydraulic cylinders 11a–11d, respectively. The fluid passages P1–P4 are provided with variable orifices 15a–15d, respectively. Accumulators 16a–16d are connected to the fluid passages P1–P4, respectively. In cooperation with the coil springs 14a–14d, the variable orifices 15a–15d and the accumulators 16a–16d, the hydraulic cylinders 11a–11d elastically support the vehicle body 10 relative to the wheels W1–W4, and also function as shock absorbers for damping oscillations of the vehicle body 10. The variable orifices 15a–15d are electrically controlled so as to vary their orifice openings. The control of the orifice openings of the variable orifices 15a–15d is not directly related to the invention, and will not be described.

The fluid passages P1, P2 and the fluid passages P3, P4 are connected, at their ends opposite the hydraulic cylinders 11a, 11b and 11c, 11d, to common fluid passages, respectively. Therefore, hydraulic fluid is collectively supplied to and discharged from the hydraulic cylinders 11a, 11b through the fluid passages P1, P2, and hydraulic fluid is collectively supplied to and discharged from the hydraulic cylinders 11c, 11d through the fluid passages P3, P4. The fluid passages P2, P4 are provided with gate valves 17b, 17d formed by electromagnetic on-off valves, respectively. The gate valves 17b, 17d are open as indicated in FIG. 1 when not energized, and are switched to a closed state when energized. The gate valves 17b, 17d are energized when the vehicle body 10 rolls, for example, at the time of cornering or turning, so as to prevent communication between the hydraulic cylinders 11a and 11b and communication between the hydraulic cylinders 11c and 11d, respectively. The operation of the gate valves 17b, 17d is not directly relevant to the invention, and the description below will be made on the assumption that the gate valves 17b, 17d are always in the open state as indicated in FIG. 1. The fluid passages P1, P3 are provided with invariable orifices 17a, 17c, respectively, for providing the fluid passages P1, P3 with a passage resistance equivalent to that provided by orifice openings that are formed by the gate valves 17b, 17d when in the open state.

A hydraulic pressure supply-discharge device for supplying hydraulic fluid to and discharging fluid from the hydraulic cylinders 11a–11d has a hydraulic pump 22 that is driven by an electric motor 21. The hydraulic pump 22 draws hydraulic fluid from a reservoir tank 23, and ejects the fluid into a fluid passage P5 through a check valve 22a. In this embodiment, the hydraulic pump 22 is formed by a gear pump. The fluid passage P5 divides into fluid passages P6, P7. The branch fluid passage P6 is connected to the connecting point of the fluid passages P1, P2. The branch fluid passage P7 is connected to the connecting point of the fluid passages P3, P4. The fluid passages P6, P7 are provided with leveling valves 24a, 24b that are formed by electromagnetic on-off valves, each made up of a plunger, a coil and the like. The leveling valves 24a, 24b remain closed as indicated in FIG. 1 when not energized, and are switched to an open state when energized. If the hydraulic pressure in the fluid passages P1–P4 becomes abnormally high, the leveling valves 24a, 24b allow discharge of hydraulic fluid from the fluid passages P1–P4 into the fluid passage P5 for protection of the apparatus even while the valves are in the closed state.

An accumulator 25 that accumulates high-pressure hydraulic fluid is connected to the fluid passage P5, via an accumulator valve 26. The hydraulic fluid accumulated in the accumulator 25 is used to increase the vehicle height. The accumulator valve 26 is formed by an electromagnetic on-off valve made up of a plunger, a coil and the like. The accumulator valve 26 remains in a state indicated in FIG. 1 when not energized. When energized, the accumulator valve 26 is switched from the state indicated in FIG. 1 to an open state. The accumulator valve 26 allows hydraulic fluid to flow from the fluid passage P5 into the accumulator 25 only when the hydraulic pressure in the fluid passage P5 is a predetermined amount higher than the hydraulic pressure in the accumulator 25.

A discharge valve 27 and a relief valve 28 are disposed between the fluid passage P5 and the reservoir tank 23. The discharge valve 27 is normally kept in an open state, and mechanically switched to a closed state when the ejecting pressure of the hydraulic pump 22 increases. The passage area of the discharge valve 27 when the discharge valve 27 is kept in the open state is at least twice as large as the passage area of the leveling valves 24a, 24b when they are in the open state. The relief valve 28 is normally kept in a closed state. Only when the hydraulic pressure in the fluid passage P5 becomes very high is the relief valve 28 switched to an open state to let hydraulic fluid out of the fluid passage P5 into the reservoir tank 23 for protection of the apparatus.

The electric motor 21, the leveling valves 24a, 24b and the accumulator valve 26 are connected to a microcomputer 30 that forms an electric control device. The microcomputer 30 receives a voltage BV from a battery 31, via an ignition switch (not shown). When the ignition switch is turned on, the microcomputer 30 repeatedly executes a main program illustrated in FIG. 2 (including the subroutines illustrated in FIGS. 3 through 10) and a drive control program illustrated in FIG. 11 (including first to third duty ratio control routines illustrated in FIG. 12) at predetermined short intervals of time, thereby controlling the supply of hydraulic fluid to and discharge thereof from the hydraulic cylinders 11a–11d. The microcomputer 30 is connected to an A/D converter 30a, a target vehicle height changing switch 32, vehicle height sensors 33a–33c, a fluid temperature sensor 34 and a hydraulic pressure sensor 35.

The A/D converter 30a converts the output voltage BV of the battery 31, and outputs the converted voltage. The A/D converter 30a serves as a device for detecting the output voltage BV of the battery 31. The target vehicle height changing switch 32 is provided for an occupant to operate to change the vehicle height. The target vehicle height changing switch 32 includes an up-setting element 32a for increasing the vehicle height from a present level, and a down-setting element 32b for reducing the vehicle height from a present level. The vehicle height sensors 33a, 33b are disposed between the vehicle body 10 and the lower arms 12a, 12b at the left and right front wheels W1, W2, respectively. Each of the vehicle height sensors 33a, 33b detects the height of the vehicle body 10 at the left or right front wheel W1, W2 relative to a road surface (or an under-spring member), and outputs a detection signal indicating the actual vehicle height Hf1, Hf2. The vehicle height sensor 33c is disposed at a transversely middle position in a rear portion of the vehicle body 10, between the vehicle body 10 and a frame (corresponding to an under-spring member not shown) connecting the lower arms 12c and 12d. The vehicle height sensor 33c detects the height of the vehicle body 10 at the transversely middle position in the rear portion of the vehicle, relative to the road surface (or the under-spring member), and outputs a detection signal indicating the actual vehicle height Hr.

The fluid temperature sensor 34 is provided in the fluid passage P5, and detects a temperature T of hydraulic fluid ejected into the fluid passage P5 from the hydraulic pump 22, and outputs a detection signal indicating the temperature T. The temperature T of hydraulic fluid thus detected is substantially equal to the temperature of hydraulic fluid in the fluid passages P1–P7 and the temperature of various component parts of the hydraulic system, for example, the temperature of the hydraulic pump 22. Therefore, the fluid temperature sensor 34 may also be provided in any of the fluid passages P1–P7 or a component part such as the hydraulic pump 22, so as to detect a temperature of hydraulic fluid in that fluid passage or a temperature of that component part of the hydraulic system. The hydraulic pressure sensor 35 detects a hydraulic pressure P of hydraulic fluid ejected from the hydraulic pump 22, and outputs a detection signal indicating the hydraulic pressure P.

A duty ratio control circuit 36 is connected between the microcomputer 30 and the leveling valves 24a, 24b and between the microcomputer 30 and the accumulator valve 26. The duty ratio control circuit 36 is supplied with power from the battery 31, and applies rectangular waveform voltages to the valves 24a, 24b and 26 having duty ratios determined by control signals from the microcomputer 30.

The operation of the thus-constructed embodiment will be described. When an ignition switch (not shown) is turned on to start the engine, the microcomputer 30 executes a program (not illustrated) to initially set "0" in various flags used in programs described below, and then starts to repeatedly execute the main program illustrated in FIG. 2 and the drive control program illustrated in FIG. 11 at predetermined short time intervals.

When the main program is started in step 100, the microcomputer 30 receives inputs of detection signals from the vehicle height sensors 33a–33c, the fluid temperature sensor 34 and the hydraulic pressure sensor 35 indicating the actual vehicle heights Hf1, Hf2, Hr, the temperature T and the hydraulic pressure P in step 102. If the actual vehicle heights Hf1, Hf2, Hr, the temperature T and the hydraulic pressure P from the sensors 33a–33c, 34, 35 have instantaneous changes and therefore are not suitable for direct use in the operations by the microcomputer 30, the signals of the actual vehicle heights Hf1, Hf2, Hr, the temperature T and the hydraulic pressure P are subjected to low-pass filter processing. After performing step 102, the microcomputer 30 calculates an actual vehicle height Hf (=(Hf1+Hf2)/2) of a front portion of the vehicle body 10 by averaging the actual vehicle heights Hf1, Hf2 in step 104.

Subsequently in step 106, the microcomputer 30 determines whether a second suspension flag STP2 is "0". If the second suspension flag STP2 is "0", the execution of an accumulator control routine in step 108 is allowed. If the second suspension flag STP2 is "1", the execution thereof is prohibited. The second suspension flag STP2 is initially set to "0", and then set to "1" or "0" by the execution of a suspending control routine in step 124 in accordance with the condition of the fluid temperature T determined in a fluid temperature determining routine in step 122. After steps 106, 108, it is determined in step 110 whether a first suspension flag STP1 is "0". If the first suspension flag STP1 is "0", the execution of a routine in steps 112 through 120 is allowed. If the first suspension flag STP1 is "1", the execution of the routine is prohibited. The first suspension flag STP1 is initially set to "0", and then set to "1" or "0" by the execution of the suspending control routine in step 124 in accordance with the condition of the fluid temperature T determined in the fluid temperature routine in step 122.

The accumulator control routine in step 108 controls the outflow and inflow of hydraulic fluid with respect to the accumulator 25. A front raising control routine in step 112 raises a front portion of the vehicle body 10 when the actual vehicle height Hf of the front portion of the vehicle deviates at least a predetermined amount downward from a target front vehicle height Hf*, so as to automatically return the actual vehicle height Hf of the front portion of the vehicle body 10 to the target vehicle height Hf*. A rear raising control routine in step 114 raises a rear portion of the vehicle body 10 when the actual vehicle height Hr of the rear portion of the vehicle deviates at least a predetermined amount downward from a target rear vehicle height Hr*, so as to automatically return the actual vehicle height Hr of the rear portion of the vehicle body 10 to the target vehicle height Hr*. A front lowering control routine in step 116 lowers the front portion of the vehicle body 10 when the actual vehicle height Hf of the front portion of the vehicle deviates at least a predetermined amount upward from the target front vehicle height Hf*, so as to automatically return the actual vehicle height Hf of the front portion of the vehicle body 10 to the target vehicle height Hf*. A rear lowering control routine in step 118 lowers the rear portion of the vehicle body 10 when the actual vehicle height Hr of the rear portion of the vehicle deviates at least a predetermined amount upward from the target rear vehicle height Hr*, so as to automatically return the actual vehicle height Hr of the rear portion of the vehicle body 10 to the target vehicle height Hr*. A target vehicle height changing routine in step 120, when the target vehicle height changing switch 32 is operated, changes the target vehicle heights Hf*, Hr* in accordance with the operation on the target vehicle height changing switch 32, and raises or lowers the front and rear portions of the vehicle body 10 so that the actual vehicle heights Hf, Hr become equal to the target vehicle heights Hf*, Hr*.

Figure 11:
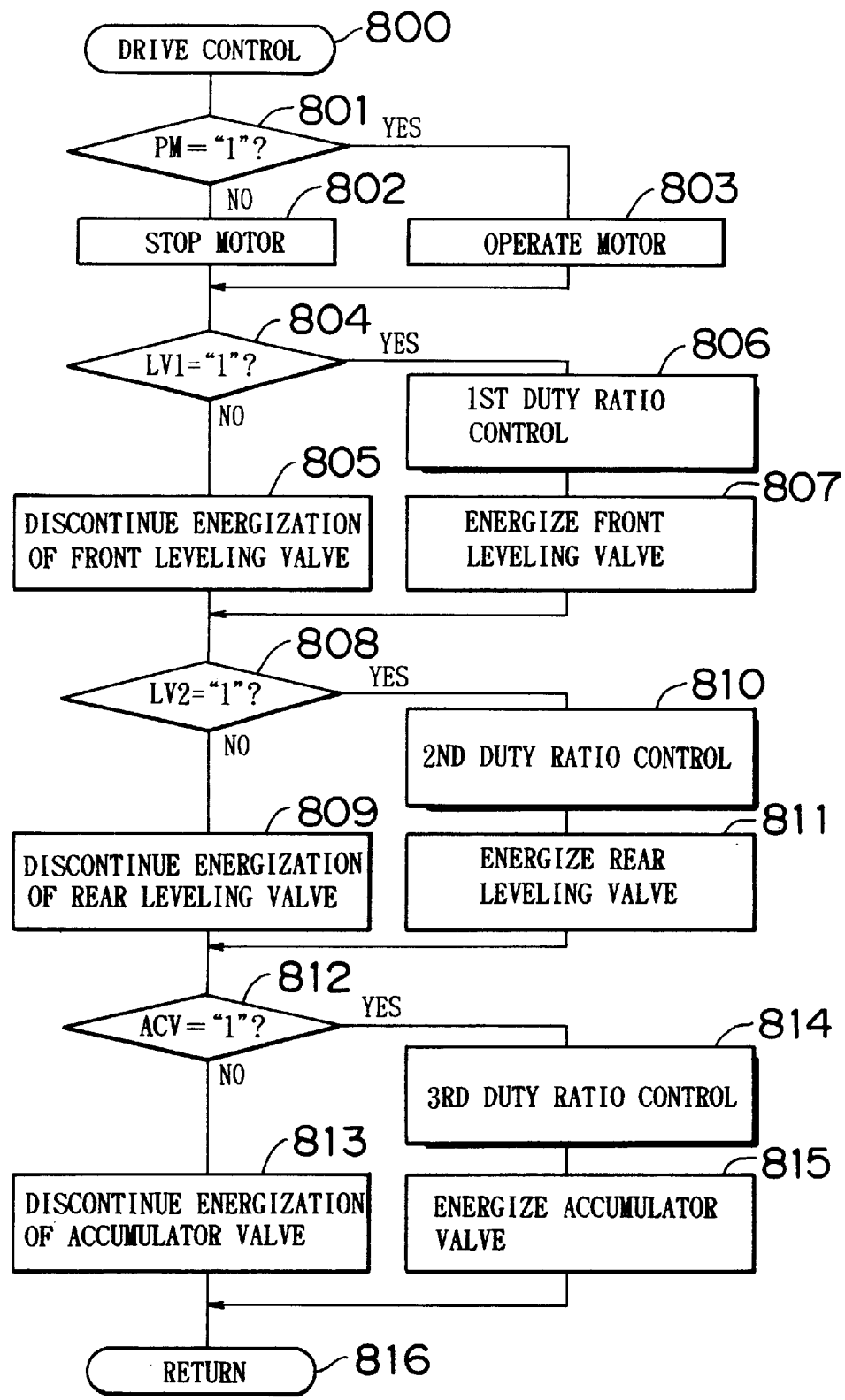
FIG. 11 is a flowchart illustrating a drive control program executed by the microcomputer shown in FIG. 1.

The drive control program illustrated in FIG. 11, including steps 800 through 816, controls the hydraulic pump 22, the leveling valves 24a, 24b and the accumulator valve 26. Specifically, the process of steps 801 through 803 controls the operation and non-operation of the hydraulic pump 22 in accordance with a pump flag PM that indicates the non-operation of the hydraulic pump 22 by "0" and the operation of the hydraulic pump 22 by "1". The process of steps 804 through 815 controls the energization and non-energization of the valves 24a, 24b, 26 in accordance with valve flags LV1, LV2, ACV that indicate the non-energization of the valves 24a, 24b, 26, respectively, by "0", and the energization thereof by "1". Since these flags PM, LV1, LV2, ACV are initially set to "0", the hydraulic pump 22 is kept in a non-operated state by the process of steps 801, 802, and the valves 24a, 24b, 26 are kept in a non-energized state by the process of steps 804, 805, 808, 809, 812, 813. Therefore, the hydraulic fluid in the hydraulic cylinders 11a, 11b is retained, and the hydraulic fluid in the hydraulic cylinders 11c, 11d is also retained, so that the actual vehicle heights Hf, Hr of the front and rear portions of the vehicle are maintained at levels where they have been. The operation of the vehicle height adjust control apparatus will be described below separately for each of the aforementioned routines. For the convenience in description, the accumulator control routine will be described after the target vehicle height changing routine.

a. Front Raising Control Routine

Figure 3:
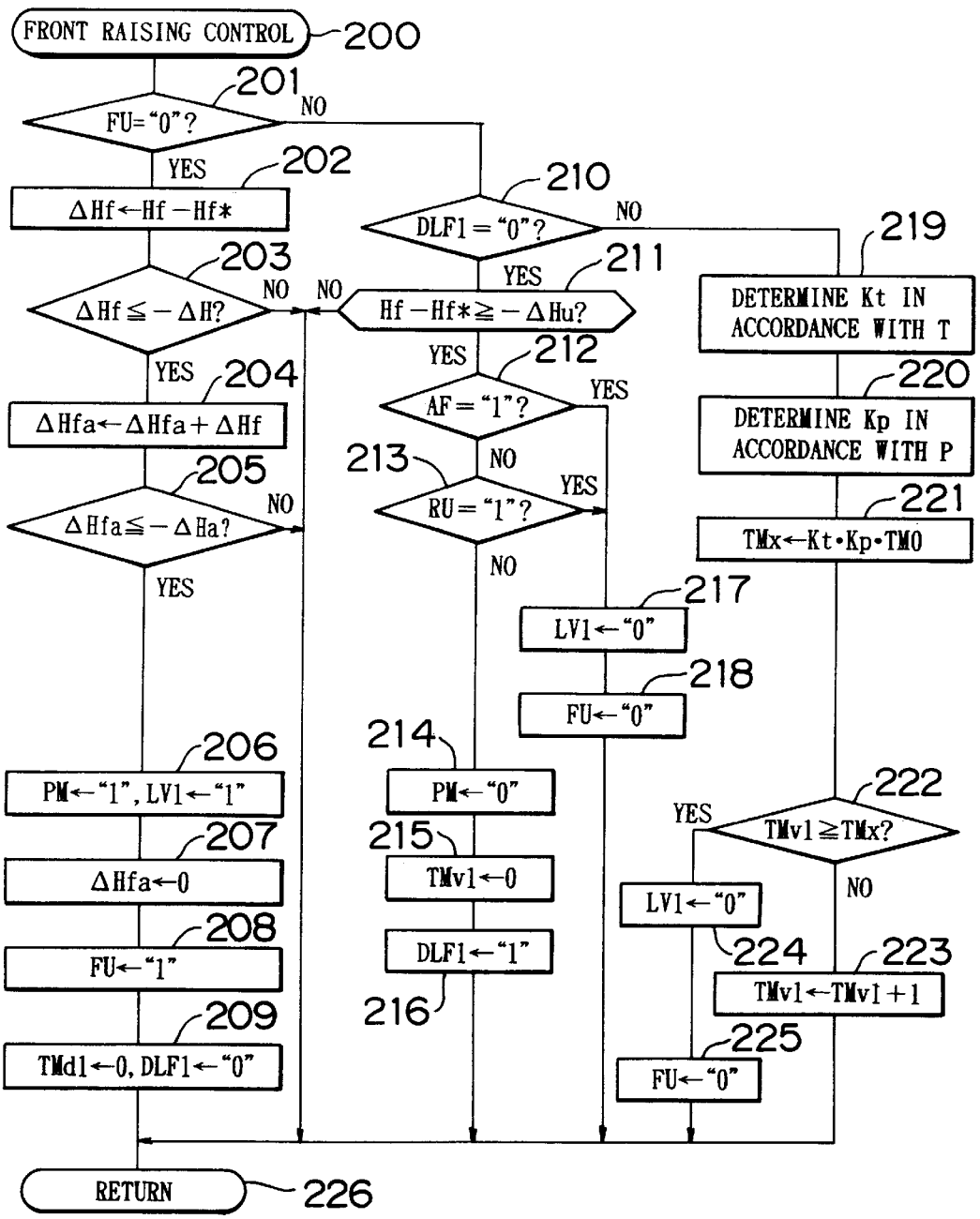
FIG. 3 is a flowchart illustrating in detail the front raising control routine indicated in FIG. 2.

FIG. 3 illustrates the front raising control routine in step 112 in detail. When the front raising control routine is started in step 200, the microcomputer 30 determines in step 201 whether a front raising flag FU is "0". The front raising flag FU indicates by "1" that the control of raising the front portion of the vehicle body 10 is being executed. The front raising flag FU is initially set to "0". Therefore, during an initial period, the determination in step 201 becomes affirmative (YES), so that the operation of the program proceeds to step 202. In step 202, the microcomputer 30 calculates a vehicle height deviation $\Delta Hf$ (=Hf−Hf*) by subtracting the target front vehicle height Hf* from the actual vehicle height Hf of the front portion of the vehicle. Subsequently in step 203, it is determined whether the vehicle height deviation $\Delta Hf$ is equal to or less than a predetermined negative threshold $-\Delta H$, that is, whether the actual vehicle height Hf of the front portion of the vehicle deviates at least the threshold $\Delta H$ downward from the target vehicle height Hf*. If the actual vehicle height Hf of the front portion of the vehicle does not deviate downward from the target vehicle height Hf* by at least the threshold ΔH, the determination in step 203 becomes negative(NO), and the execution of the front raising control routine ends in step 226. In this case, the actual vehicle height Hf is maintained at a level where it has been.

Next described will be the operation performed in a case where the actual vehicle height Hf of the front portion of the vehicle is reduced by, for example, an occupant or a load added. If the actual vehicle height Hf of the front portion of the vehicle decreases and the vehicle height deviation ΔHf becomes equal to or less than the threshold −ΔH, the microcomputer 30 makes an affirmative determination (YES) in step 203. Then in step 204, the microcomputer 30 calculates an accumulated value ΔHfa of vehicle height deviations ΔHf by performing an arithmetic operation represented by expression 1.

$$\Delta Hfa = \Delta Hfa + \Delta Hf \qquad (1)$$

Until the accumulated value ΔHfa becomes equal to or less than a predetermined negative value −ΔHa, the microcomputer 30 repeatedly makes a negative determination (NO) in step 205. Because the accumulated value ΔHfa is initially cleared to zero and because step 204 is executed at predetermined time intervals, the accumulated value ΔHfa is substantially equivalent to the integral of the vehicle height deviation ΔHf (the amount of deviation of the actual vehicle height Hf from the target vehicle height Hf*). If the accumulated value (integral) ΔHfa becomes equal to or less than the predetermined value −ΔHa, the microcomputer 30 makes an affirmative determination(YES) in step 205. Then in step 206, the microcomputer 30 sets the pump flag PM and the valve flag LV1 to "1". After clearing the accumulated value ΔHfa to zero in step 207, the microcomputer 30 sets the front raising flag FU to "1" in step 208. Subsequently in step 209, the microcomputer 30 clears a timer count value TMd1 to zero, and sets a delay flag DLF1 to "0". The timer count value TMd1 indicates elapsed time from the start of energization of the leveling valve 24a, and is used to change the duty ratio of the voltage applied to the leveling valve 24a during the energization thereof, in accordance with the elapse of time. The delay flag DLF1 is used in an operation for discontinuing the energization of the leveling valve 24a at a predetermined time following a stop of operation of the hydraulic pump 22.

When the pump flag PM and the valve flag LV1 are set to "1" as described above, the microcomputer 30 makes an affirmative determination (YES) in steps 801, 804 in the drive control program in FIG. 11. Therefore, by the process of steps 803, 807, the instruction to operate the electric motor 21 is outputted, and the instruction to energize the leveling valve 24a is outputted via the duty ratio control circuit 36. As a result, the hydraulic pump 22 is driven so that the hydraulic pump 22 draws hydraulic fluid from the reservoir tank 23 and ejects it into the fluid passage P5. In response to the ejection of hydraulic fluid, the discharge valve 27 is switched to the closed state, so that hydraulic fluid is supplied to the hydraulic cylinders 11a, 11b through the leveling valve 24a and the fluid passages P6, P1, P2. Consequently, the hydraulic cylinders 11a, 11b start to raise the positions of the vehicle body 10 at the left and right front wheels W1, W2.

For the energization of the leveling valve 24a, the duty ratio of the voltage applied to the leveling valve 24a is determined by the execution of the first duty ratio control routine in step 806, and the duty ratio control data DC1 representing the duty ratio determined in step 806 is outputted to the duty ratio control circuit 36 in step 807.

Therefore, controlled by the data DC1, the duty ratio control circuit 36 applies to the leveling valve 24a a rectangular waveform voltage signal having the duty ratio. The first duty ratio control routine is illustrated in detail in FIG. 12. When the first duty ratio control routine is started in step 820, the microcomputer 30 receives inputs of the fluid temperature T from the fluid temperature sensor 34 and the output voltage BV of the battery 31 through the A/D converter 30a in step 821.

Figure 13A:
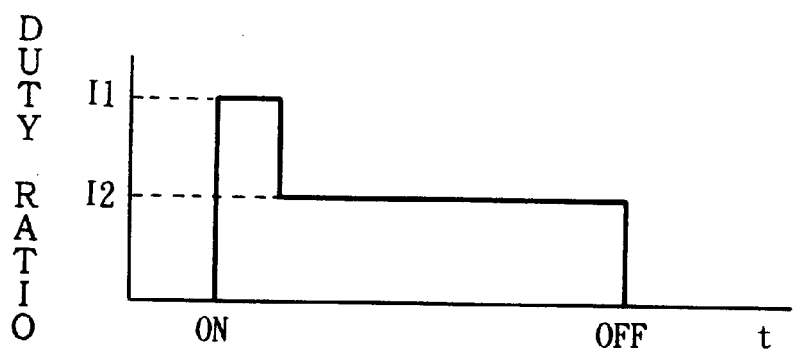
FIG. 13A is a timing chart illustrating the changes over time of the duty ratio of the voltage applied to a valve.

After the execution of step 821, it is determined in step 822 whether the timer count value TMd1 becomes equal to or greater than a predetermined value TMd0. The timer count value TMd1 has been cleared to zero in step 209, so that the timer count value TMd1 is less than the predetermined value TMd0 immediately after the energization is started. Therefore, the determination in step 822 becomes negative (NO), and the operation of the program proceeds to step 823. In step 823, the microcomputer 30 sets the duty ratio control data DC1 to a large predetermined value I1 (for example, a value representing a duty ratio of 100%). Subsequently in step 824, the microcomputer 30 adds 1 to the timer count TMd1. In step 828, the execution of the first duty ratio control routine is ended. The process of steps 821 through 824 in the first duty ratio control routine is executed every time the drive control program is executed, until the timer count TMd1 becomes equal to or greater than the predetermined value TMd0. Therefore, the voltage having the duty ratio represented by the large predetermined value I1 is continuously applied to the leveling valve 24a as indicated in FIG. 13A.

Figure 13B:
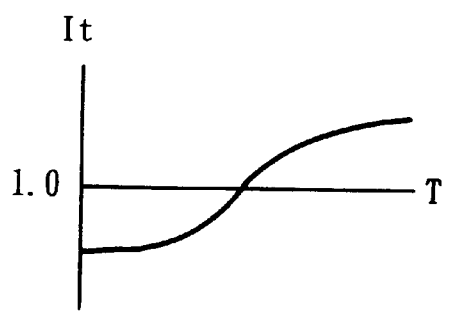
FIG. 13B is a graph indicating the changing characteristic of a correction coefficient. It for correcting the duty ratio, relative to the fluid temperature T.
Figure 13C:
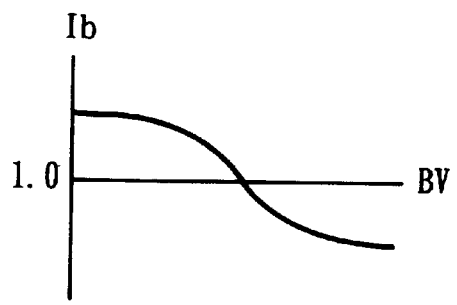
FIG. 13C is a graph indicating the changing characteristic of a correction coefficient Ib for correcting the duty ratio, relative to the battery voltage BV.

When the timer count TMd1 becomes equal to or greater than the predetermined value TMd0 as time elapses, an affirmative determination (YES) is made in step 822, so that the duty ratio control data DC1 is determined by the process of steps 825 through 827. The microcomputer 30 determines correction coefficients It, Ib corresponding to the fluid temperature T and the output voltage BV of the battery 31 inputted in step 821, with reference to the first and second duty ratio correction coefficient tables provided in the microcomputer 30, in steps 825, 826, respectively. The correction coefficient It gradually changes from a value less than "1.0" to a value greater than "1.0" as the fluid temperature T increases, as indicated in FIG. 13B. The correction coefficient Ib gradually changes from a value greater than "1.0" to a value less than "1.0" as the output voltage BV of the battery 31 increases, as indicated in FIG. 13C. In step 827, a predetermined value I2 (for example, a value indicating a duty ratio of 50%) that is less than the predetermined value I1 is multiplied by the correction coefficients It, Ib, and the result of the multiplication It×Ib×I2 is set as the duty ratio control data DC1. From this time on, the voltage having the duty ratio It×Ib×I2 calculated in step 827 is continuously applied to the leveling valve 24a as indicated in FIG. 13A.

Through this control of the duty ratio of the voltage applied to the leveling valve 24a, the duty ratio of the voltage applied to the leveling valve 24a during a period immediately after the start of energization thereof is greater than the duty ratio of the voltage applied thereto afterwards. Therefore, a large current flows through the coil of the leveling valve 24a during the period immediately after the start of application of the voltage thereto, during which a large attraction force is needed to move the plunger of the leveling valve 24a. During the following period when only a small attraction force is needed to retain the plunger at a predetermined position, a small current flows through the coil. The power consumption is thus reduced while precise operation of the leveling valve 24a is ensured. Furthermore, while the voltage having the small duty ratio is being applied to the leveling valve 24a, the small duty ratio increases as the fluid temperature T increases and as the output voltage BV of the battery 31 decreases. Therefore, a coil current needed to attract the plunger can be secured even if the temperature of the coil in the leveling valve 24a increases so that the resistance of the coil increases, or if the output voltage BV of the battery 31 decreases. Consequently, the malfunction of the leveling valve 24a due to changes in the fluid temperature or the battery voltage can be prevented, and precise operation of the leveling valve 24a can be ensured.

Although this embodiment performs control such that the duty ratio during the energization of the leveling valve 24a is changed in accordance with the elapsed time, the fluid temperature T and the output voltage BV of the battery 31, it is also possible to change the duty ratio in accordance with only one or two of the elapsed time, the fluid temperature T and the output voltage BV of the battery 31, depending on the operating conditions or vehicle types.

During the rise of the front portion of the vehicle body 10, the front raising flag FU is set to "1" in step 208, and the delay flag DLF1 is set to "0" in step 209, as described above, so that the microcomputer 30 continually makes a negative determination (NO) in step 201 and an affirmative determination (YES) in step 210. Therefore, the operation of the program proceeds to step 211. In step 211, the microcomputer 30 determines whether the difference Hf–Hf* between the actual vehicle height Hf of the front portion of the vehicle and the target vehicle height Hf* is equal to or greater than a predetermined negative value –ΔHu whose absolute value is relatively small. As long as the amount of rise of the front portion of the vehicle body 10 is small so that the different Hf–Hf* is less than the predetermined value –ΔHu, the microcomputer 30 continually makes negative determination (NO) in step 211, and ends the execution of the front raising control routine in step 266.

When the difference Hf–Hf* becomes equal to or greater than the predetermined value –ΔHu through the control of raising the front portion of the vehicle body 10, the microcomputer 30 makes an affirmative determination (YES) in step 211, and determines in step 212 whether an accumulator flag AF is "1", and, if it is not "1", determines in step 213 whether a rear raising flag RU is "1". The accumulator flag AF indicates by "1" that the accumulator 25 is under a pressure accumulating control. The rear raising flag RU indicates by "1" that the control of raising the rear portion of the vehicle body 10 is being executed. If both flags AF, RU are "0", the microcomputer 30 makes a negative determination (NO) in steps 212, 213, and proceeds to the process of steps 214 through 216. The microcomputer 30 sets the pump flag PM to "0" in step 214, clears a timer count TMv1 for delaying the switching of the leveling valve 24a to the closed state to zero in step 215, and sets the delay flag DLF1 to "1" in step 216. Then, the execution of the front raising control routine is ended in step 226. Therefore, when the drive control program of FIG. 11 is executed, the instruction to stop the electric motor 21 is outputted through the process of steps 801, 802. Then, the operation of the electric motor 21 is stopped. The next time the front raising control routine is executed, the determination in step 210 becomes negative (NO), so that the microcomputer 30 executes the process of steps 219 through 225 for switching the leveling valve 24a to the closed state after a delay following the output of the instruction to stop the hydraulic pump 22.

After the affirmative determination (YES) in step 211, if either the accumulator flag AF or the front raising flag FU is "1", the microcomputer 30 makes an affirmative determination (YES) in either step 212 or 213, and proceeds to steps 217, 218. The microcomputer 30 sets the valve flag LV1 and the front raising flag FU back to "0" in steps 217, 218, respectively. Subsequently in step 226, the execution of the front raising control routine is ended. Therefore, when the drive control program of FIG. 11 is executed afterwards, the instruction to discontinue the energization of the leveling valve 24a is outputted through the process of steps 804, 805. Then the leveling valve 24a is switched to the closed state, so that the control of raising the front portion of the vehicle body 10 is ended. Further, since the front raising flag FU is set back to "0" in step 218, the microcomputer 30 will execute the process of steps 202 through 209 during the next execution of the front raising control program. In steps 202 through 209, the microcomputer 30 executes an operation for outputting an instruction to start increasing the front portion of the vehicle body 10. The reason why the front raising control routine is ended without outputting the instruction to stop the electric motor 21 and the hydraulic pump 22 if either the accumulator flag AF or the rear raising flag RU is "1" is that the instruction to stop the electric motor 21 and the hydraulic pump 22 is outputted in the rear raising control routine or the accumulator control routine described below. In addition, the reason why the leveling valve 24a is switched to the closed state immediately after the detection of completion of raise of the front portion of the vehicle body 10 in step 211 is that impact of hydraulic fluid on the leveling valve 24a is avoided because the accumulator valve 26 or the leveling valve 24b has been set to the open state by the control of accumulating pressure in the accumulator or the control of raising the rear portion of the vehicle body 10.

Figure 2:
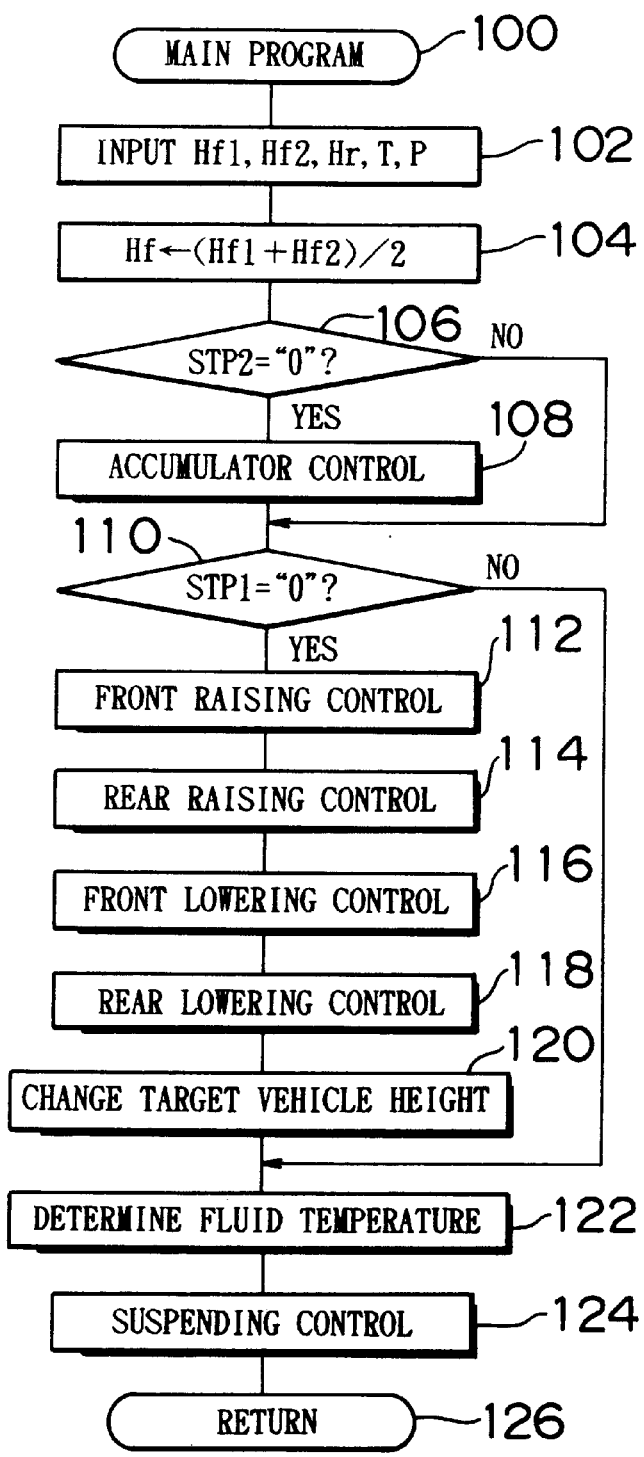
FIG. 2 is a flowchart illustrating a main program executed by the microcomputer shown in FIG. 1.
Figure 14A:
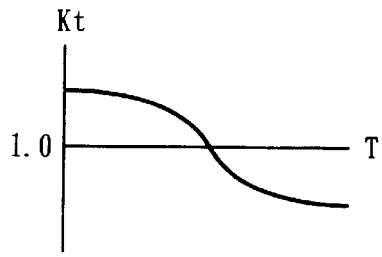
FIG. 14A is a graph indicating the changing characteristic of a correction coefficient Kt for correcting the delay time to switch a valve to the closed state, relative to the fluid temperature T.
Figure 14B:
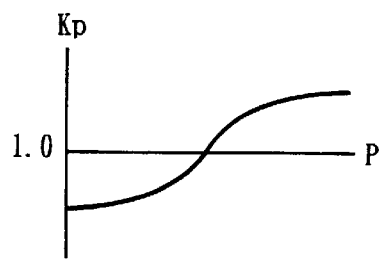
FIG. 14B is a graph indicating the changing characteristic of a correction coefficient Kp for correcting the delay time, relative to the hydraulic pressure P.

In the process of steps 219 through 225 after the instruction to stop the electric motor 21 and the hydraulic pump 22, the microcomputer 30 first determines correction coefficients Kt, Kp corresponding to the fluid temperature T and the hydraulic pressure P inputted in step 102 of the main program of FIG. 2, with reference to first and second delay time correction coefficient tables provided in the microcomputer 30, in steps 219, 220, respectively. The correction coefficient Kt gradually changes from a value greater than "1.0" to a value less than "1.0" as the fluid temperature T increases, as indicated in FIG. 14A. The correction coefficient Kp gradually changes from a value less than "1.0" to a value greater than "1.0" as the hydraulic pressure P increases, as indicated in FIG. 14B. In step 221, a predetermined value TM0 indicating a delay time is multiplied by the correction coefficients Kt, Kp, and the result of the multiplication Kt×Kp×TM0 is set as the delay time value TMx.

After the execution of step 221, it is determined in step 222 whether the timer count value TMv1 has become equal to or greater than the delay time value TMx calculated in the previous step. Because the timer count TMv1 was cleared to zero in step 215, the timer count TMv1 is less than the delay time value TMx for a period immediately after the instruction to stop the electric motor 21 and the hydraulic pump 22. During such a period, therefore, the microcomputer 30 repeatedly makes a negative determination (NO) in step 222, adds 1 to TMv1 in step 223, and ends the execution of the front raising control routine in step 226. When the timer count TMv1 becomes equal to or greater than the delay time value TMx, the microcomputer 30 makes an affirmative determination (YES) in step 222, and proceeds to steps 224, 225. The microcomputer 30 sets the valve flag LV1 and the front raising flag FU back to "0" in steps 224, 225, respectively, and then ends the execution of the front raising control routine in step 226. Therefore, when the drive control program of FIG. 11 is performed afterwards, the instruction to stop energizing the leveling valve 24a is outputted by the process of steps 804, 805. Then, the leveling valve 24a is switched to the closed state, and the control of raising the front portion of the vehicle body 10 is ended. In addition, since the front raising flag FU has been back to "0" in step 225, the microcomputer 30 will execute the process of steps 202–209 described above the next time the front raising control routine is executed. In steps 202 through 209, the microcomputer 30 executes an operation for outputting an instruction to start raising the front portion of the vehicle body 10.

By the process of steps 210 and 219–225, the leveling valve 24a is switched from the open state to the closed state at the elapse of the delay time value TMx following the stop instruction to the electric motor 21 and the hydraulic pump 22 has been given. As a result, the leveling valve 24a is switched to the closed state after the electric motor 21 and the hydraulic pump 22 have substantially stopped, even though the ejection of hydraulic fluid from the hydraulic pump 22 may continue due to the inertia of the electric motor 21 and the like for a certain time after the instruction to stop the electric motor 21 and the hydraulic pump 22. Thus, impact of hydraulic pump ejected from the hydraulic pump 22 on the leveling valve 24a can be prevented or minimized. Consequently, impact noise caused by the aforementioned impact can be considerably reduced, and the durability of the component parts of the hydraulic system, such as the hydraulic pump 22, the leveling valve 24a and the like, can be considerably improved.

Furthermore, the process of steps 219–221 sets the delay time value TMx so that as the fluid temperature T decreases and as the hydraulic pressure P increases, the value TMx increases. Therefore, in a condition that the fluid temperature T is low and the viscosity of the hydraulic fluid is high and, as a result, an impact of hydraulic fluid on the leveling valve 24a will be great, or in a condition that the pressure of hydraulic fluid ejected from the hydraulic pump 22 is high and, as a result, an impact of hydraulic fluid on the leveling valve 24a will be great, this embodiment increases the delay time between the instruction to stop the hydraulic pump 22 and the instruction to switch the leveling valve 24a from the open state to the closed, thereby effectively preventing or minimizing impact of hydraulic fluid on the leveling valve 24a. Consequently, the embodiment is able to precisely reduce impact noise without unnecessarily delaying the switching of the leveling valve 24a from the open state to the closed state if the hydraulic fluid temperature or the ejecting pressure of the hydraulic pump 22 changes. As a result, the embodiment precisely prevents or minimizes deterioration of the durability of the hydraulic system, including the hydraulic pump 22, the leveling valve 24a and the like, that is caused by impact of hydraulic fluid thereon.

Although in this embodiment the length of time between the instruction to stop the hydraulic pump 22 and the switching of the leveling valve 24a to the closed state is variable in accordance with the fluid temperature T and the hydraulic pressure P, it is also possible to omit the variable control in accordance with either the fluid temperature T or the hydraulic pressure P or both, depending on the operating conditions or vehicle types.

b. Rear Raising Control Routine

Figure 4:
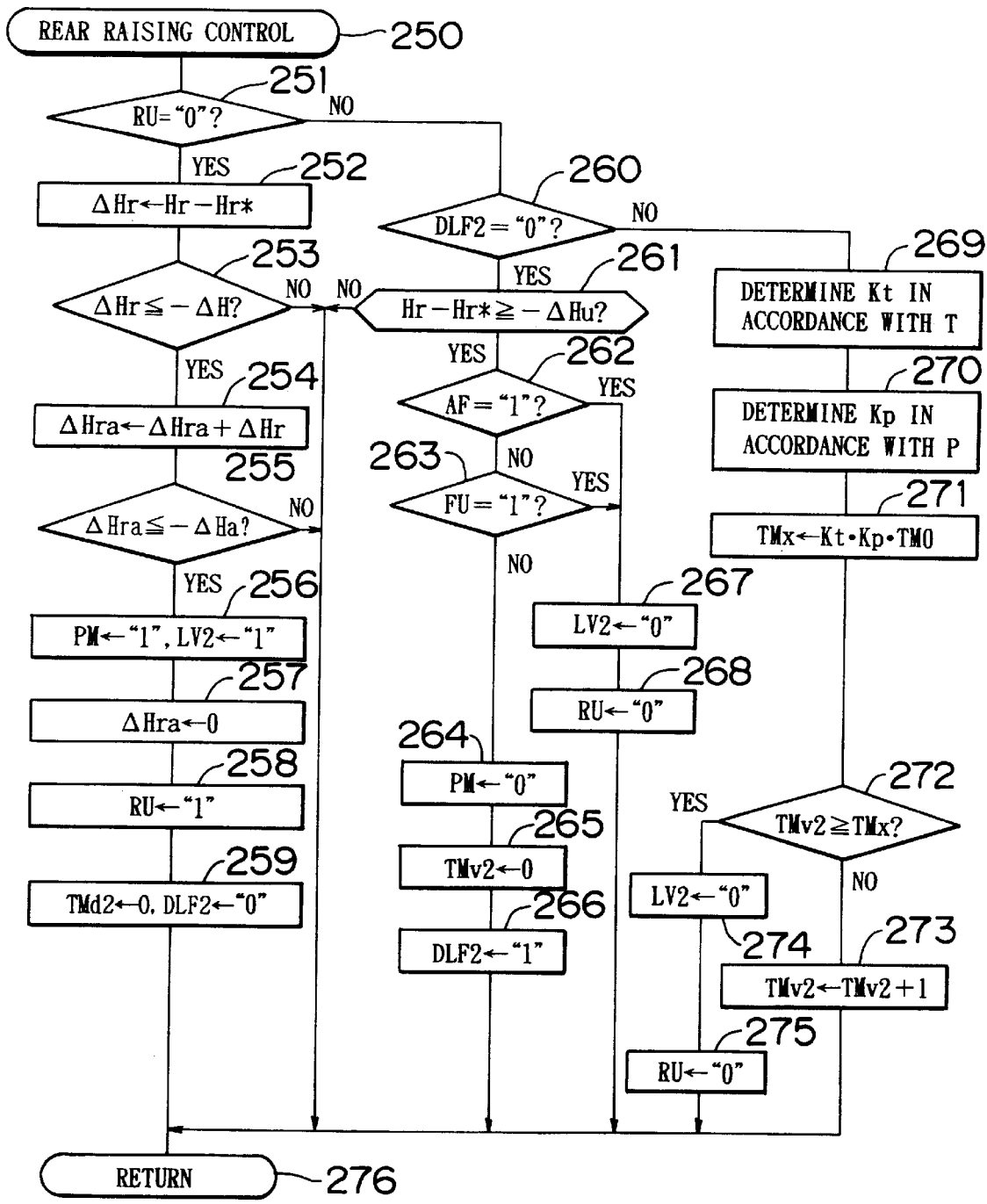
FIG. 4 is a flowchart illustrating in detail the rear raising control routine indicated in FIG. 2.

The rear raising control routine of step 114 in the main control illustrated in FIG. 2 has steps 250 through 276 as illustrated in detail in FIG. 4. The process of steps 251 through 259 controls the start of raise of the rear portion of the vehicle body 10. By this operation, the microcomputer 30 outputs an instruction to operate the electric motor 21 and the hydraulic pump 22, and an instruction to switch the leveling valve 24b to the open state. The process of steps 260 through 275 controls the end of raise of the rear portion of the vehicle body 10. By this operation, the microcomputer 30 outputs an instruction to stop the operation of the electric motor 21 and the hydraulic pump 22 and an instruction to switch the leveling valve 24b to the closed state. In this operation, the output of the valve switching instruction is delayed a predetermined time from the instruction to stop the operation of the electric motor 21 and the hydraulic pump 22.

Figure 12:
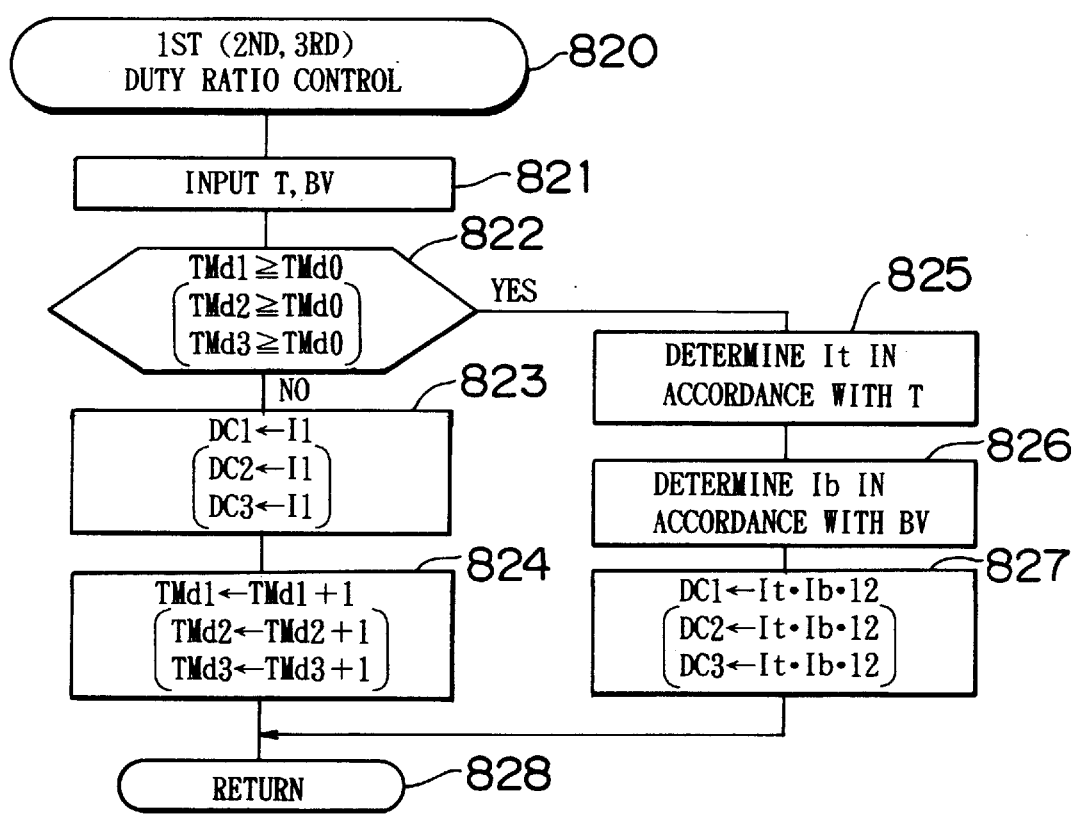
FIG. 12 is a flowchart illustrating the first to third duty ratio control routines indicated in FIG. 11.

The rear raising control routine in FIG. 4 is substantially the same as the front raising control routine in FIG. 3, except that the various variables related to the front portion of the vehicle are replaced by various variables related to the rear portion of the vehicle. Therefore, the rear raising control routine will not be described in detail. For the rear raising control routine, the microcomputer 30 executes in step 810 in FIG. 11 the second duty ratio control routine, which is illustrated in FIG. 12 together with the first duty ratio control routine. Therefore, if a rear vehicle height reduction occurs, the actual vehicle height Hr of the rear portion of the vehicle body 10 is automatically increased to a target vehicle height Hr*, thereby achieving substantially the same advantages as achieved by the front raising control routine.

c. Front Lowering Control Routine

Figure 5:
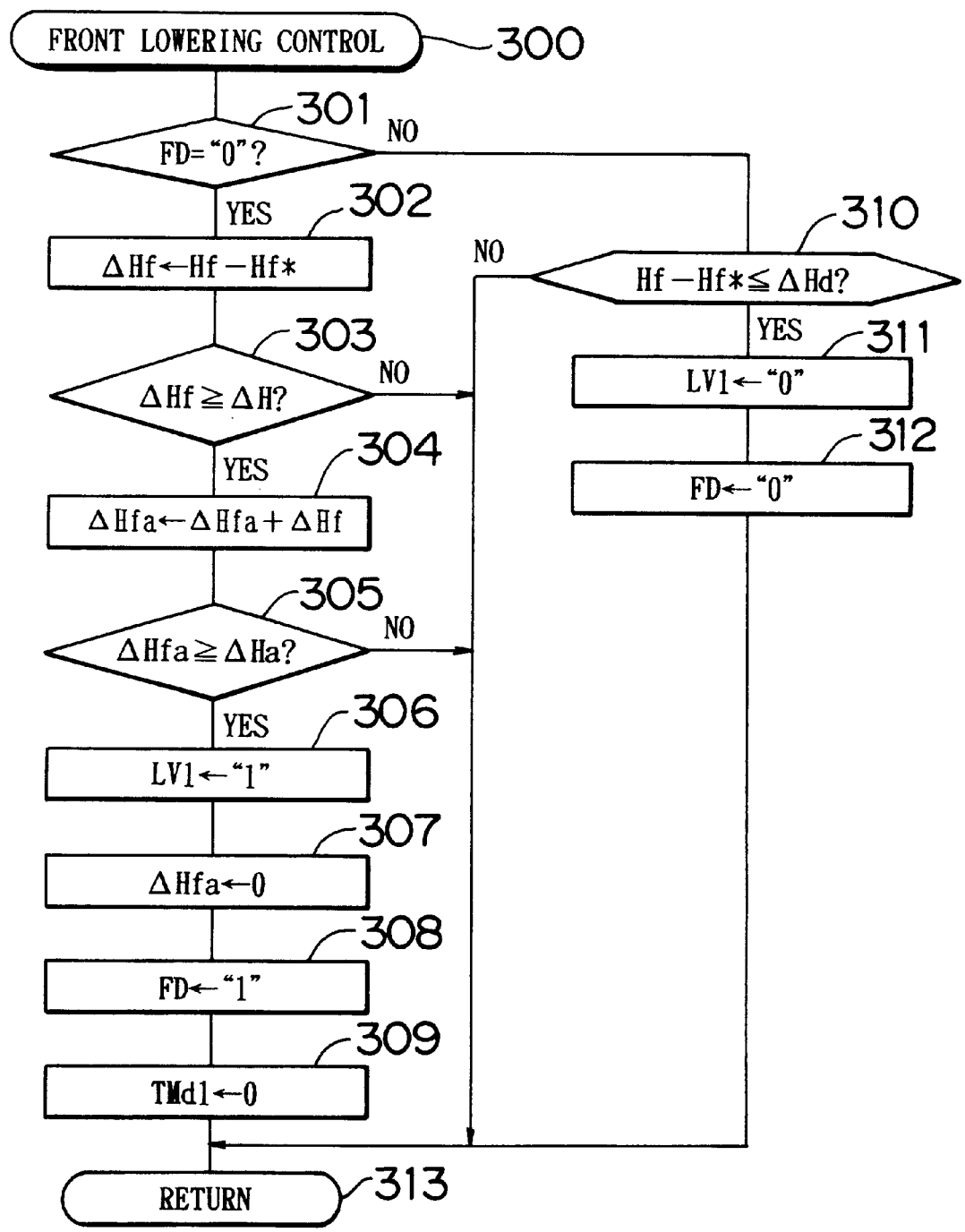
FIG. 5 is a flowchart illustrating in detail the front lowering control routine indicated in FIG. 2.

The front lowering control routine of step 116 in the main program of FIG. 2 is illustrated in detail in FIG. 5. When the routine is started in step 300, the microcomputer 30 determines in step 301 whether a front lowering flag FD is "0". The front lowering flag FD indicates by "1" that the control of lowering the front portion of the vehicle body 10 being executed. The front lowering flag FD is initially set to "0". Therefore, during an initial period, the determination in step 301 becomes affirmative (YES), so that the operation of the program proceeds to step 302. In step 302, the microcomputer 30 calculates a vehicle height deviation ΔHf (=Hf−Hf*) by subtracting the target front vehicle height Hf* from the actual vehicle height Hf of the front portion of the vehicle, as in step 202 in the front raising control routine. Subsequently in step 303, it is determined whether the vehicle height deviation ΔHf is equal to or greater than a predetermined positive threshold ΔH, that is, whether the actual vehicle height Hf of the front portion of the vehicle deviates at least the threshold ΔH upward from the target vehicle height Hf*. If the actual vehicle height Hf of the front portion of the vehicle does not deviate upward from the target vehicle height Hf* by at least the threshold ΔH, the determination in step 303 becomes negative(NO), and the execution of the front lowering control routine ends in step 313. In this case, the actual vehicle height Hf is maintained at a level where it has been.

Next described will be the operation performed in a case where the actual vehicle height Hf of the front portion of the vehicle is increased by, for example, an occupant or a load removed. If the actual vehicle height Hf of the front portion of the vehicle increases and the vehicle height deviation ΔHf becomes equal to or greater than the threshold ΔH, the microcomputer 30 makes an affirmative determination (YES) in step 303. Then in step 304, the microcomputer 30 calculates an accumulated value ΔHfa (=ΔHfa+ΔHf) of the vehicle height deviation ΔHf by performing an arithmetic operation of expression (1). Until the accumulated value ΔHfa becomes equal to or greater than a predetermined positive value ΔHa, the microcomputer 30 repeatedly makes a negative determination (NO) in step 305. Because the accumulated value ΔHfa is initially cleared to zero and because step 304 is executed every predetermined time, the accumulated value ΔHfa is substantially equivalent to the integral of the vehicle height deviation ΔHf (the amount of deviation of the actual vehicle height Hf from the target vehicle height Hf*). If the accumulated value (integral) ΔHfa becomes equal to or greater than the predetermined value ΔHa, the microcomputer 30 makes an affirmative determination (YES) in step 305. Then in step 306, the microcomputer 30 sets the valve flag LV1 to "1". After clearing the accumulated value ΔHfa to zero in step 307, the microcomputer 30 sets the front lowering flag FD to "1" in step 308. Subsequently in step 309, the microcomputer 30 clears the timer count value TMd1 to zero. The timer count value TMd1 is used to control the duty ratio of the voltage applied to the leveling valve 24a during the energization thereof.

When the valve flag LV1 is set to "1" as described above, the microcomputer 30 makes an affirmative determination (YES) in step 804 in the drive control program in FIG. 11. Therefore, by the process of steps 806, 807, the leveling valve 24a is energized under control by the duty ratio control circuit 36. The leveling valve 24a is thereby switched to the open state, so that the hydraulic pump is discharged from the hydraulic cylinders 11a, 11b into the reservoir tank 23, through the fluid passages P1, P2, P6, the leveling valve 24a, the fluid passage P5 and the discharge valve 27. Therefore, the hydraulic cylinders 11a, 11b start lowering the positions of the vehicle body 10 at the left and right front wheels W1, W2. As in the case of the front raising control routine, the duty ratio DC1 for energization of the leveling valve 24a is variably controlled in accordance with the elapsed time, the fluid temperature T and the output voltage BV of the battery 31, by the execution of the first duty control ratio routine of step 806, so that the current needed to attract the plunger of the leveling valve 24a can be secured and precise operation of the leveling valve 24a can be ensured.

While the front portion of the vehicle body 10 is being lowered, the front lowering flag FD remains at "1" as set in step 308, so that the microcomputer 30 repeatedly makes a negative determination (NO) in step 301, and proceeds to step 310. In step 310, it is determined whether the difference Hf–Hf* between the target vehicle height Hf* and the actual vehicle height Hf of the front portion of the vehicle is equal to or less than a relatively small predetermined value ΔHd. As long as the amount of descent of the front portion of the vehicle body 10 is small so that the difference Hf–Hf* is greater than the predetermined value ΔHd, the microcomputer 30 repeatedly makes a negative determination (NO) in step 310, and ends the execution of the front lowering control routine in step 313.

When the difference Hf–Hf* becomes equal to or less than the predetermined value ΔHd through the control of lowering the front portion of the vehicle body 10, the microcomputer 30 makes an affirmative determination (YES) in step 310, and sets the valve flag LV1 and the front lowering flag FD back to "0" in steps 311, 312, respectively, and ends the execution of the front lowering control routine in step 313. Therefore, when the drive control program of FIG. 11 is executed afterwards, the instruction to discontinue the energization of the leveling valve 24a is outputted by the process of steps 804, 805. Then, the leveling valve 24a is switched to the closed state, and the control of lowering the front portion of the vehicle body 10 is ended. In addition, since the front lowering flag FD is set back to "0" in step 312, the operation of outputting the instruction to start lowering the front portion of the vehicle body 10 in steps 302 through 309 will be executed, the next time the front lowering control program is executed.

d. Rear Lowering Control Routine

Figure 6:
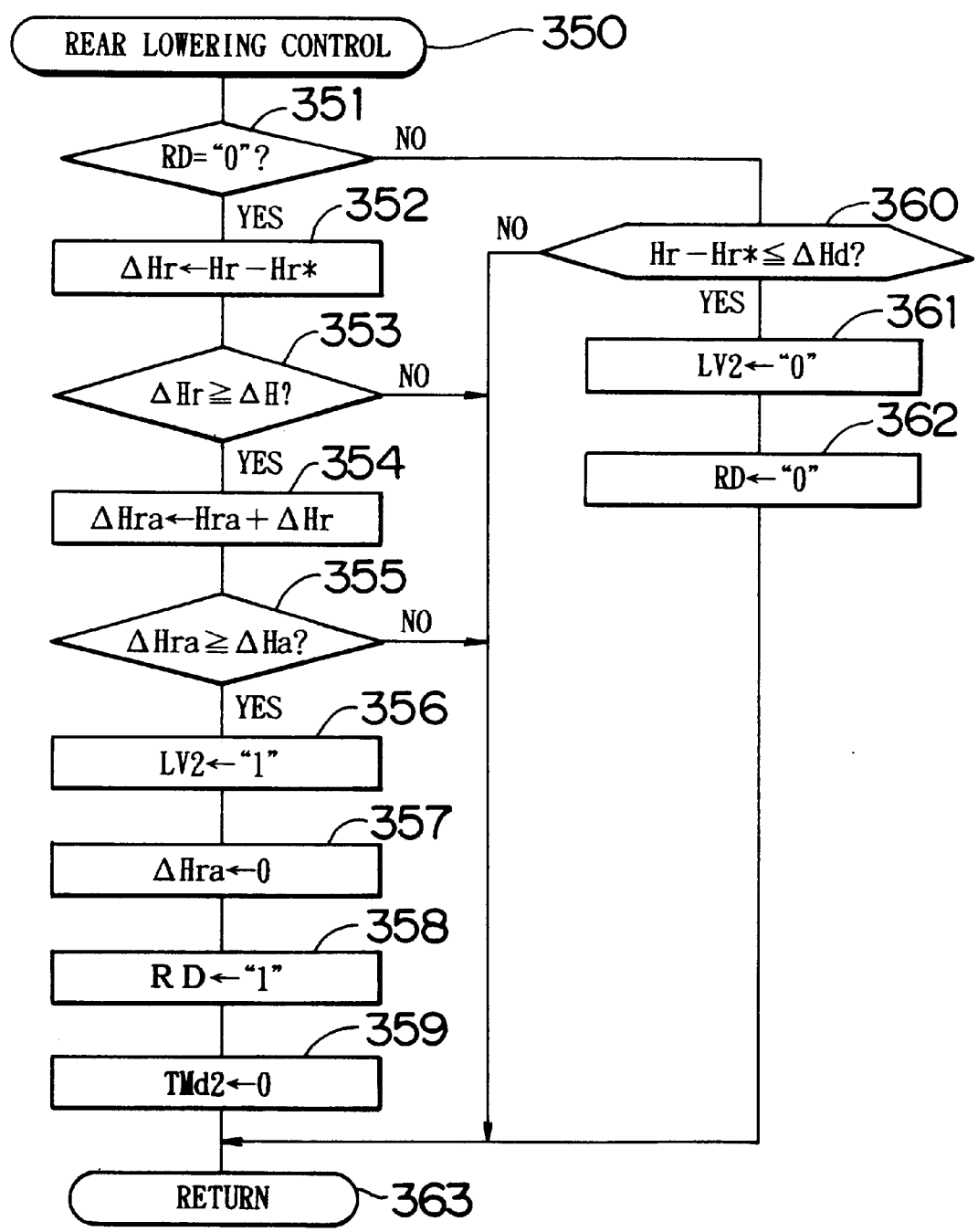
FIG. 6 is a flowchart illustrating in detail the rear lowering control routine indicated in FIG. 2.

The rear lowering control routine of step 118 in the main program of FIG. 2 has steps 350 through 363 as illustrated in detail in FIG. 6. The process of steps 351 through 359 controls the start of descent of the rear portion of the vehicle body 10. By this operation, an instruction to switch the leveling valve 24b to the open state is outputted. The process of steps 360 through 362 controls end of the descent of the rear portion of the vehicle body 10. By this control, an instruction to switch the leveling valve 24b to the closed state is outputted.

The rear lowering control routine in FIG. 6 is substantially the same as the front lowering control routine in FIG. 5, except that the various variables related to the front portion of the vehicle are replaced by various variables related to the rear portion of the vehicle. Therefore, the rear lowering control routine will not be described in detail. For the rear lowering control routine, the microcomputer 30 executes in step 810 in FIG. 11 the second duty ratio control routine, which is illustrated in FIG. 12 together with the first duty ratio control routine. Therefore, if a rear vehicle height increase occurs, the actual vehicle height Hr of the rear portion of the vehicle body 10 is automatically decreased to the target vehicle height Hr*, thereby achieving substantially the same advantages as achieved by the front lowering control routine.

e. Target Vehicle Height Changing Routine

Figure 7:
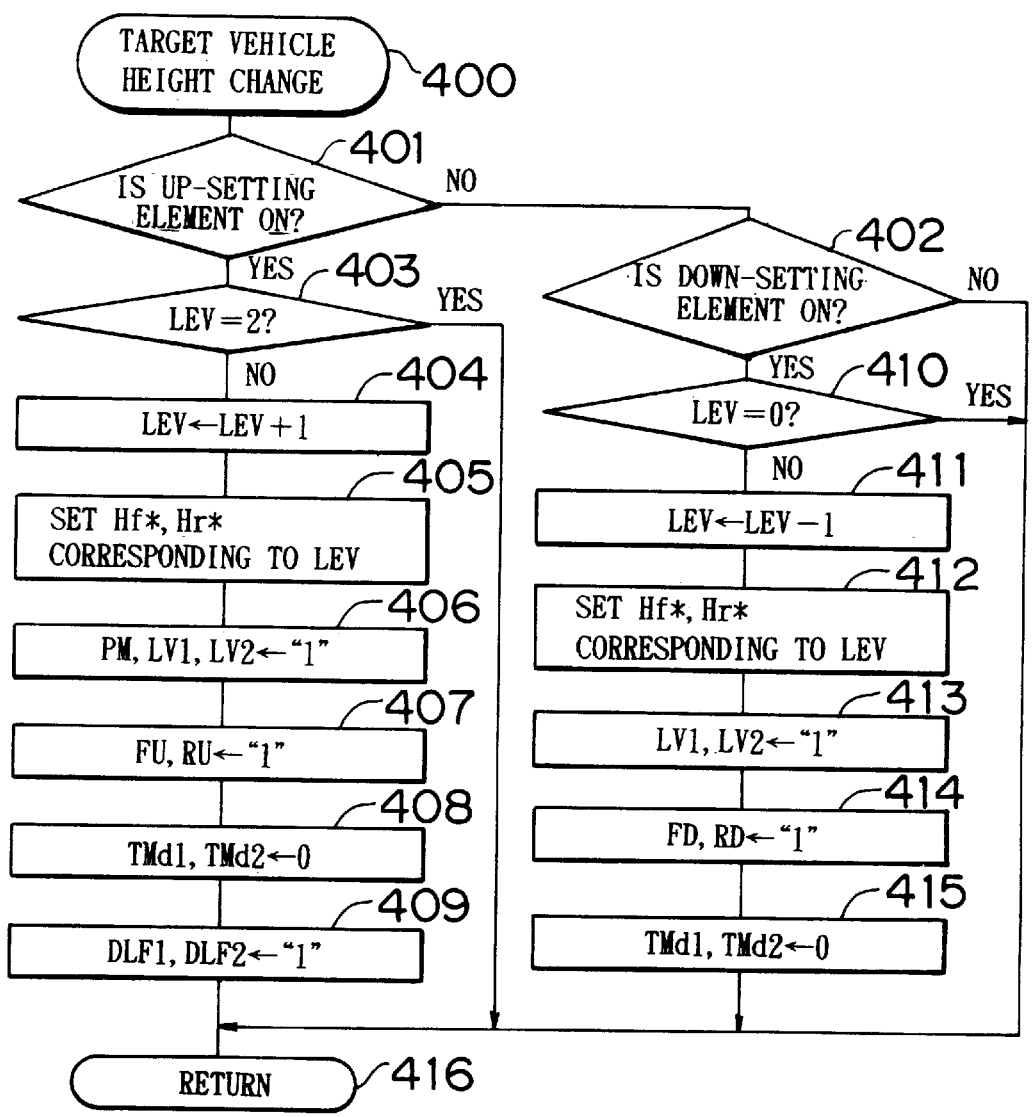
FIG. 7 is a flowchart illustrating in detail the target vehicle height changing routine indicated in FIG. 2.

The target vehicle height changing routine of step 120 in the main program of FIG. 2 is illustrated in detail in FIG. 7. When the target vehicle height changing routine is started in step 400, the microcomputer 30 determines in step 401 whether the up-setting element 32a of the target vehicle height changing switch 32 is turned on and, if it is not on, determines in step 402 whether the down-setting element 32b is turned on. If neither the up-setting element 32a nor the down-setting element 32b are turned on, the microcomputer 30 makes a negative determination (NO) in steps 401, 402, and ends the execution of the target vehicle height changing routine in step 416.

If the up-setting element 32a is turned on, the microcomputer 30 makes affirmative determination (YES) in step 401, and determines in step 403 whether level data LEV is 2. The level data LEV indicates LOW, INTERMEDIATE and HIGH target vehicle heights by 0, 1 and 2, respectively. If the target vehicle height has been set to HIGH and, therefore, the level data LEV is 2, the determination in step 404 becomes affirmative. In this case, the target vehicle height cannot be further increased. Therefore, the execution of the target vehicle height changing routine is ended in step 416. Conversely if the level data LEV is not 2, the microcomputer 30 makes a negative determination (NO) in step 403, and proceeds to steps 404–406. The microcomputer 30 increases the level data LEV by 1 in step 404, and sets the target vehicle heights Hf*, Hr* to values corresponding to the increased level data LEV in step 405. The level data LEV and the target vehicle heights Hr*, Hr* are stored in the non-volatile memory provided in the microcomputer 30, and retained even after the ignition switch has been turned off.

Subsequently in step 406, the pump flag PM and the valve flags LV1, LV2 are set to "1". Therefore, when the drive control program of FIG. 11 is executed afterwards, the instruction to start the electric motor 21 and the instruction to energize the leveling valves 24a, 24b are outputted by the process of steps 801, 803, 804, 806, 807, 808, 810 and 811. Thus, the hydraulic pump 22 starts to eject hydraulic fluid so that hydraulic fluid is supplied to the hydraulic cylinders 11a–11d through the leveling valves 24a, 24b, thereby simultaneously starting to raise the front and rear portions of the vehicle body 10.

After executing step 406, the microcomputer 30 sets the front raising flag FU and the rear raising flag RU to "1" in step 407, and clears the timer counts TMd1, TMd2 to zero in step 408, and sets the delay flags DLF1, DLF2 to "1". Therefore, the process of steps 210 and 219 through 225 is executed in the front raising control routine of FIG. 3, and the process of steps 260 and 269 through 275 is executed in the rear raising control routine of FIG. 4. By the process of steps 210 and 219 through 225 and steps 260 and 269 through 275, the raise of the front and rear portions of the vehicle body 10 is ended when the actual vehicle heights Hf, Hr of the front and rear portions of the vehicle body 10 become substantially equal to the target vehicle heights Hf*, Hr* changed in the target vehicle height changing routine. The actual vehicle heights Hf, Hr are thus set to the changed target vehicle heights Hf*, Hr*.

If the down-setting element 32b is turned on, the microcomputer 30 makes an affirmative determination (YES) in step 402, and determines in step 410 whether the level data LEV is 0. If the target vehicle height has already been set to LOW and therefore the level data LEV is 0, the microcomputer 30 makes an affirmative determination (YES) in step 410. In this case, the target vehicle height cannot be further reduced. Therefore, the execution of the target vehicle height changing routine is ended in step 416. Conversely if the level data LEV is not 0, the microcomputer 30 makes a negative determination (NO) in step 410, and proceeds to steps 411 through 415. The microcomputer 30 reduces the level data LEV by 1 in step 411, and sets the target vehicle heights Hf*, Hr* to values corresponding to the reduced level data LEV in step 412.

Subsequently in step 413, the valve flags LV1, LV2 are set to "1". Therefore, when the drive control program of FIG. 11 is executed afterwards, the instruction to energize the leveling valves 24a, 24b is outputted by the process of steps 804, 806, 807, 808, 810 and 811. Thus, hydraulic fluid is discharged simultaneously from the hydraulic cylinders 11a–11d through the leveling valves 24a, 24b, thereby simultaneously starting to lower the front and rear portions of the vehicle body 10.

After executing step 413, the microcomputer 30 sets the front lowering flag FD and the rear lowering flag RD to "1" in step 414, and clears the timer counts TMd1, TMd2 to zero in step 415. Therefore, the process of step 310 through 312 is executed in the front lowering control routine of FIG. 5, and the process of steps 360 through 362 is executed in the rear lowering control routine of FIG. 6. By the process of steps 310 through 312 and steps 360 through 362, the lowering of the front and rear portions of the vehicle body 10 is ended when the actual vehicle heights Hf, Hr of the front and rear portions of the vehicle body 10 become substantially equal to the target vehicle heights Hf*, Hr* changed in the target vehicle height changing routine. The actual vehicle heights Hf, Hr are thus set to the changed target vehicle heights Hf*, Hr*.

f. Accumulator Control Routine

Figure 8:
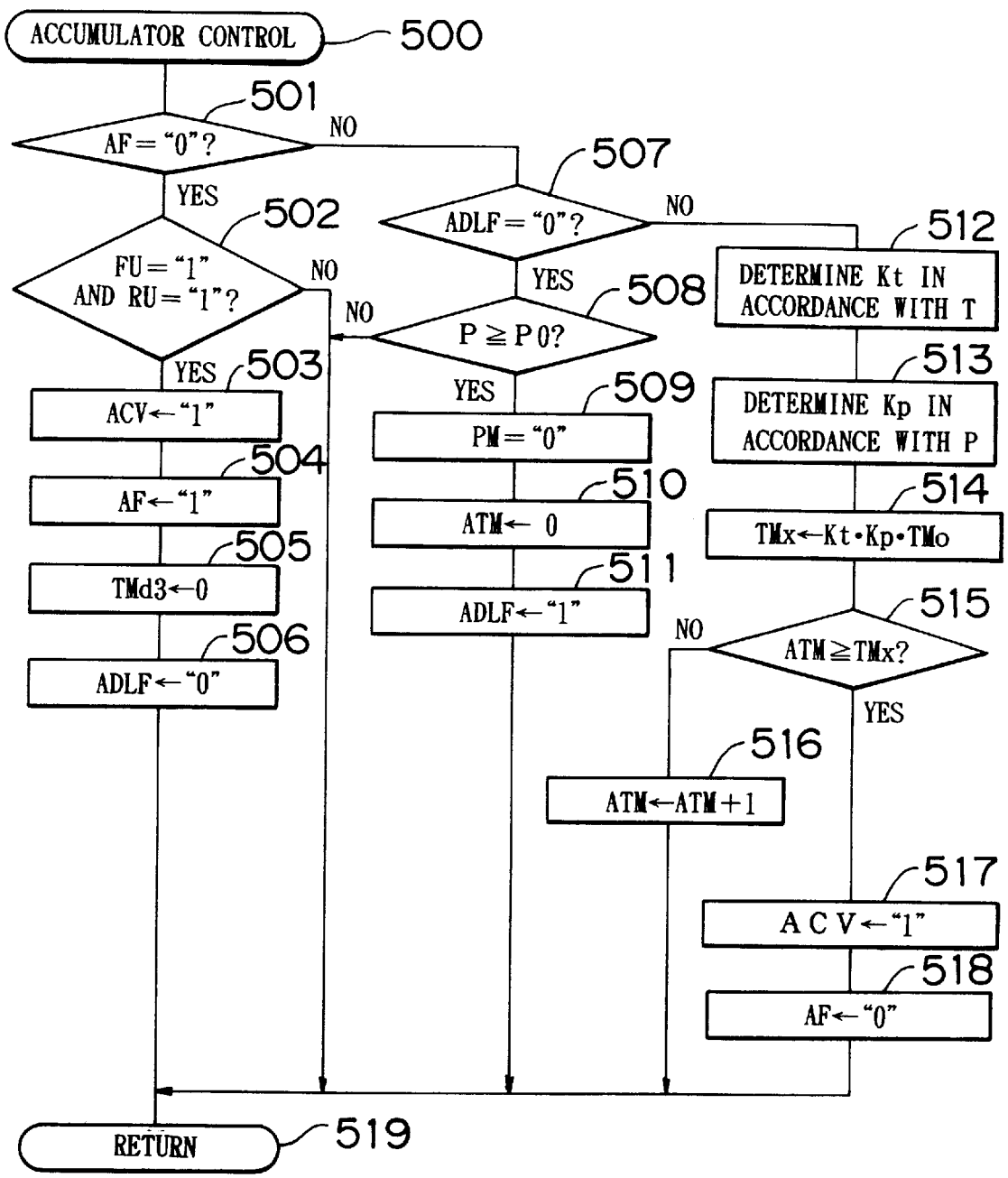
FIG. 8 is a flowchart illustrating in detail the accumulator control routine indicated in FIG. 2.

The accumulator control routine of step 108 in the main program of FIG. 2 is illustrated in detail in FIG. 8. When the accumulator control routine is started in step 500, the microcomputer 30 determines in step 501 whether the accumulator flag AF is "1". The accumulator flag AF indicates by "0" that the hydraulic fluid supply/discharge operation is not being performed on the accumulator 25, and indicates by "1" that the hydraulic fluid supply/discharge operation is being performed on the accumulator 25. The accumulator 25 is initially filled with high-pressure hydraulic fluid by execution of an initial program (not shown). The accumulator flag AF is initially set to "0" by the initial setting.

Therefore, the microcomputer 30 initially makes an affirmative determination (YES) in step 501, and determines in step 502 whether both the front raising flag FU and the rear raising flag RU are "1". If not both the flags FU and RU are "1", the microcomputer 30 makes negative determination (NO) in step 502, and ends the execution of the accumulator control routine in step 519. When, with the setting described above, the drive control program of FIG. 11 is subsequently executed, the non-energization of the accumulator valve 26 is maintained by the process of steps 812, 813 since the valve flag ACV for controlling the energization of the accumulator valve 26 is initially set to "0" (NO in step 812). Therefore, the closed state of the accumulator valve 26 is maintained, so that the high-pressure hydraulic fluid in the accumulator 25 is maintained.

If the front raising flag FU and the rear raising flag RU are set to "1" by operation of the target vehicle height changing routine, or if the front raising flag FU and the rear raising flag RU are set to "1" by the front raising control routine and the rear raising control routine, the microcomputer 30 makes an affirmative determination (YES) in step 502, and executes steps 503 through 506. In step 503, the valve flag ACV is set to "1". In step 504, the accumulator flag AF is set to "1". In step 505, a timer count TMd3 that is used to determine a duty ratio of the voltage applied to the accumulator valve 26 is cleared to zero. In step 506, a delay flag ADLF that is used to delay an instruction to switch the accumulator valve 26 to the closed state, from an instruction to stop the hydraulic pump 22, is set to "0". Subsequently in step 519, the execution of the accumulator control routine is ended.

When the drive control program of FIG. 11 is executed with the settings described above, the accumulator valve 26 is energized under control by the process of steps 812, 814, 815. Therefore, the high-pressure hydraulic fluid accumulated in the accumulator 25 is supplied together with hydraulic fluid ejected by the hydraulic pump 22, to the hydraulic cylinders 11a–11d, thereby simultaneously raising the vehicle body 10 relative to all the wheels W1–W4. Therefore, if there is a need to supply hydraulic fluid simultaneously to the four hydraulic cylinders 11a–11d, hydraulic fluid accumulated in the accumulator 25 is used together with hydraulic fluid ejected by the hydraulic pump 22 so as to quickly raise the vehicle body 10 relative to all the wheels W1–W4. Therefore, the capacity of the hydraulic pump 22 does not need to be very large.

For energization of the accumulator valve 26, the duty ratio of the voltage applied to the accumulator valve 26 is controlled by execution of the third duty ratio control routine of step 814. The third duty ratio control routine is similar to the first duty ratio control routine illustrated in FIG. 12. That is, in the third duty ratio control routine, the duty ratio DC3 is also variably controlled in accordance with the elapsed time, the fluid temperature T and the output voltage BV of the battery 31, thereby ensuring precise operation of the accumulator valve 26.

When the accumulator valve 26 is switched to the open state as described above, the accumulator flag AF has been set to "1" by step 504, and the delay flag ADLF has been set to "0" by step 506. Therefore, in the next and later executions of the accumulator control routine, the microcomputer 30 repeatedly makes a negative determination (NO) in step 501, and repeatedly makes an affirmative determination (YES) in step 507, and proceeds to step 508. In step 508, it is determined whether the hydraulic pressure P inputted in step 102, that is, the hydraulic pressure in the fluid passage P5, is equal to or greater than a predetermined hydraulic pressure P0. The predetermined hydraulic pressure P0 represents a hydraulic pressure accumulated in the accumulator 25, and has been set to a value that is higher than the hydraulic pressure accumulated in the hydraulic cylinders 11a–11d. Therefore, while the leveling valves 24a, 24b are open during the control of raising the front or rear portion of the vehicle body 10, the hydraulic pressure P remains lower than the predetermined hydraulic pressure P0, so that the microcomputer 30 repeatedly makes a negative determination (NO) in step 508, and ends the execution of the accumulator control routine in step 519.

When the control of raising the front and rear portion of the vehicle body 10 ends and the leveling valves 24a, 24b are switched to the closed state, hydraulic fluid ejected from the hydraulic pump 22 starts to flow through the accumulator valve 26 into and accumulate in the accumulator 25 and, at the same time, the hydraulic pressure P in the fluid passage P5 also starts to increase. This is achieved by the process of steps 212, 217 in the front raising control routine of FIG. 3 and by the process of steps 262, 267 in the rear raising control routine of FIG. 4. That is, if the accumulator flag AF is "1", the leveling valves 24a, 24b are switched to the closed state while the operation of the electric motor 21 and the hydraulic pump 22 is continued. Subsequently, when the hydraulic pressure P becomes equal to or greater than the predetermined hydraulic pressure P0, the microcomputer 30 makes an affirmative determination (YES) in step 508, and proceeds to the process of steps 509 through 511.

In step 509, the pump flag PM is set to "0". In step 510, a timer count ATM for delaying the switching of the accumulator valve 26 to the closed state is cleared to zero. In step 511, the delay flag ADLF is set to "1". Subsequently in step 519, the execution of the accumulator control routine is ended. Therefore, when the drive control program of FIG. 11 is executed afterwards, the instruction to stop the electric motor 21 is outputted by the process of steps 801, 802. The operation of the electric motor 21 is subsequently stopped. The next time the accumulator control routine is executed, the microcomputer 30 makes a negative determination (NO) in step 507, and proceeds to the process of steps 512 through 518.

The process of steps 512 through 516, similar to the process of steps 219 through 223 in the front raising control routine of FIG. 3, switches the accumulator valve 26 to the closed state after the delay time value TMx following the output of the instruction to stop the hydraulic pump 22, and changes the delay time value TMx in accordance with the fluid temperature T and the hydraulic pressure P. In this process, the timer count value ATM, cleared to zero in step 510, is increased by 1 in step 516. When the timer count ATM becomes equal to or greater than the delay time value TMx, the microcomputer 30 makes an affirmative determination (YES) in step 515, and proceeds to steps 517, 518. In step 517, the valve flag ACV is set back to "0". In step 518, the accumulator flag AF is set back to "0". Subsequently in step 519, the execution of the accumulator control routine is ended. When the drive control program of FIG. 11 is next executed, the energization of the accumulator valve 26 is discontinued by the process of steps 812, 813. The accumulator valve 26 is thereby switched to the closed state.

Therefore, the accumulator 25 retains therein hydraulic fluid accumulated to a high pressure that is equal to or higher than the predetermined hydraulic pump P0.

By this operation, the accumulator valve 26 is also switched to the closed state after the delay time value TMx following the output of the instruction to stop the hydraulic pump 22, as in the operation for the leveling valves 24a, 24b. Therefore, this embodiment avoids impacts of hydraulic fluid on the accumulator valve 26 even if ejection of hydraulic fluid by the hydraulic pump 22 continues for a certain time due to the inertia of the electric motor 21 and the like after the instruction to stop the electric motor 21 and the hydraulic pump 22 has been outputted.

g. Fluid Temperature Determining Routine

Figure 9:
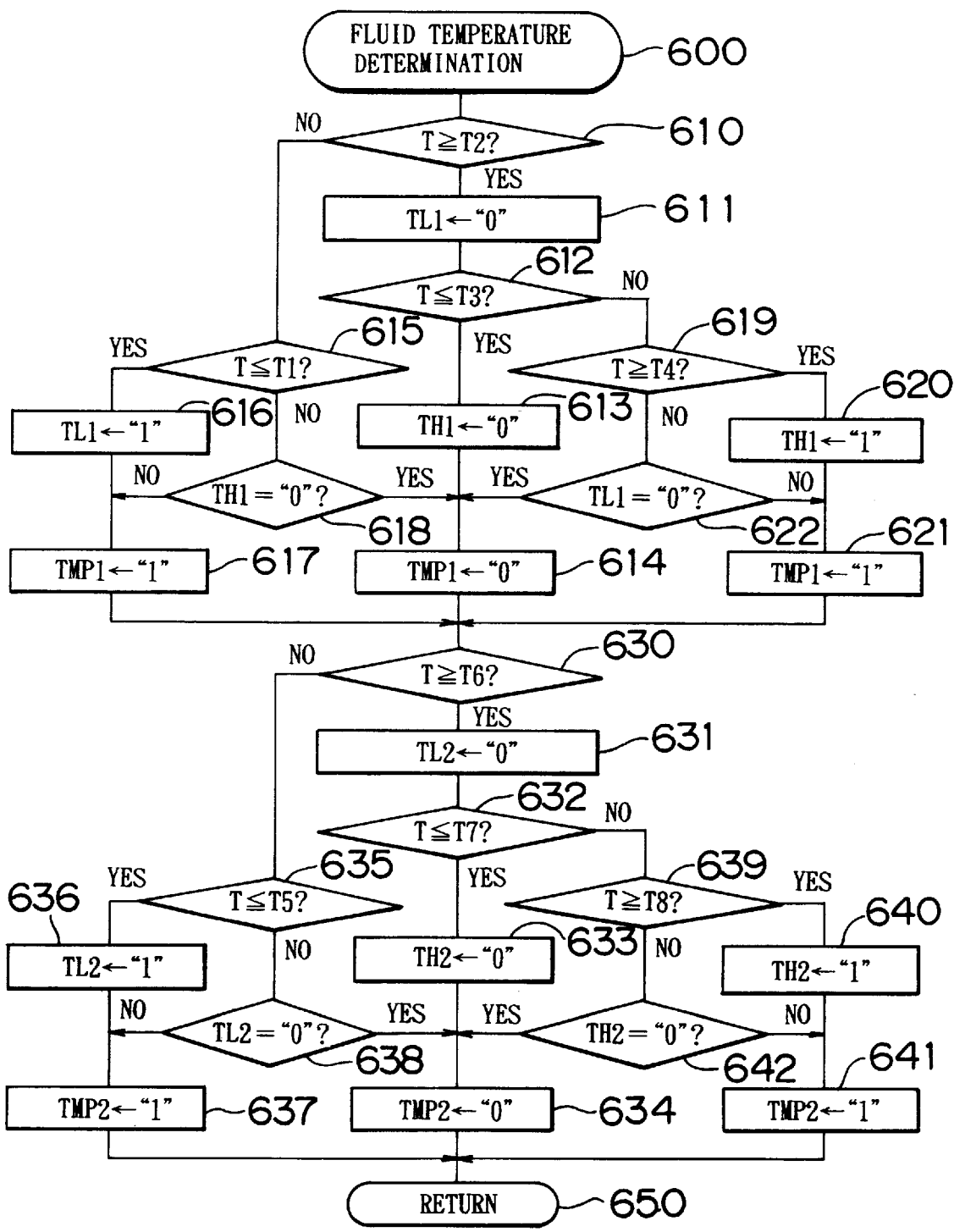
FIG. 9 is a flowchart illustrating in detail the fluid temperature determining routine indicated in FIG. 2.

The fluid temperature determining routine of step 122 in the main program of FIG. 2 is illustrated in detail in FIG. 9. After starting to execute the fluid temperature determining routine in step 600, the microcomputer 30 sets first and second fluid temperature condition flag TMP1, TMP2 to "1" or "0" on the basis of the fluid temperature T inputted in step 102 in the main program of FIG. 2.

Figure 15:
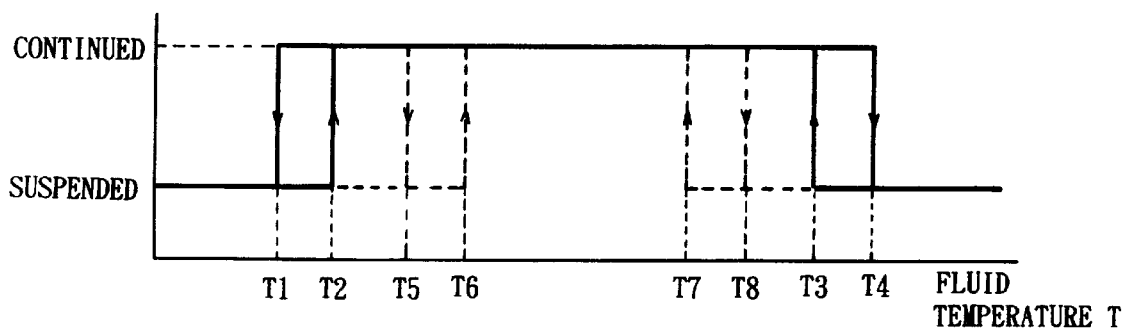
FIG. 15 is a chart illustrating the continuation and suspension of the vehicle height adjustment and accumulator control relative to changes in the fluid temperature T.

After the fluid temperature determining routine is started in step 600, the microcomputer 30 determines in step 610 whether the fluid temperature T is equal to or higher than a predetermined temperature T2. Before the description of the subsequent processing, the predetermined temperature T2 and predetermined temperatures T1, T3, T4 (mentioned below) will be described. The magnitude relationship among the predetermined temperatures T1 to T4 is T1<T2<T3<T4 as indicated in FIG. 15. The predetermined temperatures T1, T2 are relatively close to each other (for example, −30° C. and −25° C.). If the fluid temperature T is lower than these predetermined temperatures, the viscosity of the hydraulic fluid becomes very high and the fluidity thereof becomes very low. If the hydraulic pump 22 is operated in such a hydraulic fluid condition, the load on the electric motor 21 and the hydraulic pump 22 becomes very large. The predetermined temperatures T3, T4 are relatively close to each other (for example, 95° C. and 100° C.). If the fluid temperature T is higher than these predetermined temperatures, the viscosity of the hydraulic fluid becomes very low. If the hydraulic pump 22 is operated in such a hydraulic fluid condition, the ejecting performance of the hydraulic pump 22 is very low and, therefore, the electric motor 21 and the hydraulic pump 22 must be operated for an inconveniently long time in order to raise the vehicle body 10 to a predetermined height.

If the fluid temperature T is equal to or higher than the predetermined temperature T2, the microcomputer 30 makes an affirmative determination (YES) in step 610, and sets a first low temperature flag TL1 to "0" in step 611. Subsequently in step 612, it is determined whether the fluid temperature T is equal to or lower than the predetermined temperature T3. If the fluid temperature T is equal to or lower than the predetermined temperature T3, the microcomputer 30 makes an affirmative determination (YES) in step 612, and sets a first high temperature flag TH1 to "0" in step 613. Subsequently in step 614, a first temperature condition flag TMP1 is set to "0".

Conversely if the fluid temperature T is less than the predetermined temperature T2, the microcomputer 30 makes a negative determination (NO) in step 610, and determines in step 615 whether the fluid temperature T is equal to or lower than the predetermined temperature T1. If the fluid temperature T is equal to or lower than the predetermined temperature T1, the microcomputer 30 makes an affirmative determination (YES) in step 615, and sets the first low temperature flag TL1 to "1" in step 616, and sets the first temperature condition flag TMP1 to "1" in step 617. If the fluid temperature T is higher than the predetermined temperature T1 and less than the predetermined temperature T2, the microcomputer 30 makes a negative determination (NO) in steps 610, 615, and then determines in step 618 whether the first low temperature flag TL1 is "0". If the first low temperature flag TL1 is "0", the microcomputer 30 makes an affirmative determination (YES) in step 618, and proceeds to step 614 while holding the first low temperature flag TL1 at "0". Conversely, if the first low temperature flag TL1 is "1", the microcomputer 30 makes a negative determination (NO) in step 618, and proceeds to step 617 while holding the first low temperature flag TL1 at "1".

If the fluid temperature T is higher than the predetermined temperature T3, the microcomputer 30 makes a negative determination (NO) in step 612, and then determines in step 619 whether the fluid temperature T is equal to or higher than predetermined temperature T4. If the fluid temperature T is equal to or higher than the predetermined temperature T4, the microcomputer 30 makes an affirmative determination (YES) in step 619, and then sets the first high temperature flag TH1 to "1" in step 620, and sets the first temperature condition flag TMP1 to "1" in step 621. If the fluid temperature T is higher than the predetermined temperature T3 but lower than the predetermined temperature T4, the microcomputer 30 makes a negative determination (NO) in steps 612, 619, and then determines in step 622 whether the first high temperature flag TH1 is "0". If the first high temperature flag TH1 is "0", the microcomputer 30 makes an affirmative determination (YES) in step 622, and proceeds to step 614 while holding the first high temperature flag TH1 at "0". If the first high temperature flag TH1 is "1", the microcomputer 30 makes a negative determination (NO) in step 622, and proceeds to step 621 while holding the first high temperature flag TH1 at "1".

By the process of steps 610 through 621, the first temperature condition flag TMP1 is always set to "0" if the fluid temperature T is equal to or higher than the predetermined temperature T2 and equal to or lower than the predetermined temperature T3, and the first temperature condition flag TMP1 is always set to "1" if the fluid temperature T is equal to or lower than the predetermined temperature T1 or equal to or higher than the predetermined temperature T4. If the fluid temperature T is higher than the predetermined temperature T1 but lower than the predetermined temperature T2, or if the fluid temperature T is higher than the predetermined temperature T3 but lower than the predetermined temperature T4, the first temperature condition flag TMP1 is kept at "0" or "1" as it has been set, by the hysteresis process of steps 618, 622 and the like. Therefore, fluctuation of the fluid temperature T in the neighborhood of the predetermined temperatures T1, T2 or in the neighborhood of the predetermined temperatures T3, T4 will not cause frequent switching of the first temperature condition flag TMP1 between "0" and "1". However, if fluctuation of the fluid temperature T does not appear as a problem due to, for example, a relatively low sensitivity of the fluid temperature sensor 34 or low-pass filter processing of the fluid temperature T detected by the fluid temperature sensor 34, it is also possible to omit the hysteresis process. That is, it is possible to design a process wherein the first temperature condition flag TMP1 is always set to "0" if the fluid temperature T is higher than the predetermined temperature T1 and lower than the predetermined temperature T4, and the first temperature condition flag TMP1 is always set to "1" if the fluid temperature T is equal to or lower than the predetermined temperature T1 or equal to or higher than the predetermined temperature T4.

After executing the process as described above, the microcomputer 30 executes the process of steps 630 through 641, and ends the execution of the fluid temperature determining program in step 650. The process of steps 630 through 641 sets a second temperature condition flag TMP2 by comparing the fluid temperature T with predetermined temperatures T5, T6, T7, T8 wherein T5<T6<T7<T8 as indicated in FIG. 15. This process is substantially the same as the process of steps 610 through 621, except that the predetermined temperatures T1 through T4, the first low temperature flag TL1, the first high temperature flag TH1 and the first temperature condition flag TMP1 are replaced by the predetermined temperatures T5 through T8, a second low temperature flag TL2, a second high temperature flag TH2 and the second temperature condition flag TMP2. Therefore, the process of steps 630 through 641 will not be described in detail. The predetermined temperatures T5, T6 are relatively close to each other (for example, −15° C. and −10° C.). If the fluid temperature T is lower than these predetermined temperatures, the viscosity of the hydraulic fluid becomes quite high and the fluidity thereof becomes quite low. If the hydraulic pump 22 is operated in such a hydraulic fluid condition, the load on the electric motor 21 and the hydraulic pump 22 becomes quite large. The predetermined temperatures T7, T8 are relatively close to each other (for example, 85° C. and 90° C.). If the fluid temperature T is higher than these predetermined temperatures, the viscosity of the hydraulic fluid becomes quite low. If the hydraulic pump 22 is operated in such a hydraulic fluid condition, the ejecting performance of the hydraulic pump 22 is quite low and, therefore, the electric motor 21 and the hydraulic pump 22 must be operated for a long time in order to raise the vehicle body 10 to a predetermined height.

By the process of steps 630 through 641, the second temperature condition flag TMP2 is always set to "0" if the fluid temperature T is equal to or higher than the predetermined temperature T6 and equal to or lower than the predetermined temperature T7, and the second temperature condition flag TMP2 is always set to "1" if the fluid temperature T is equal to or lower than the predetermined temperature T5 or equal to or higher than the predetermined temperature T8. If the fluid temperature T is higher than the predetermined temperature T5 but lower than the predetermined temperature T6, or if the fluid temperature T is higher than the predetermined temperature T7 but lower than the predetermined temperature T8, the second temperature condition flag TMP2 is kept at "0" or "1" as it has been set, by the hysteresis process of steps 638, 642 and the like. Therefore, fluctuation of the fluid temperature T in the neighborhood of the predetermined temperatures T5, T6 or in the neighborhood of the predetermined temperatures T7, T8 will not cause frequent switching of the second temperature condition flag TMP2 between "0" and "1". However, if fluctuation of the fluid temperature T does not appear as a problem due to, for example, a relatively low sensitivity of the fluid temperature sensor 34 or low-pass filter processing of the fluid temperature T detected by the fluid temperature sensor 34, it is also possible to omit the hysteresis process. That is, it is possible to design a process wherein the second temperature condition flag TMP2 is always set to "0" if the fluid temperature T is higher than the predetermined temperature T5 and lower than the predetermined temperature T8, and the second temperature condition flag TMP2 is always set to "1" if the fluid temperature T is equal to or lower than the predetermined temperature T5 or equal to or higher than the predetermined temperature T8.

h. Suspending Control

Figure 10:
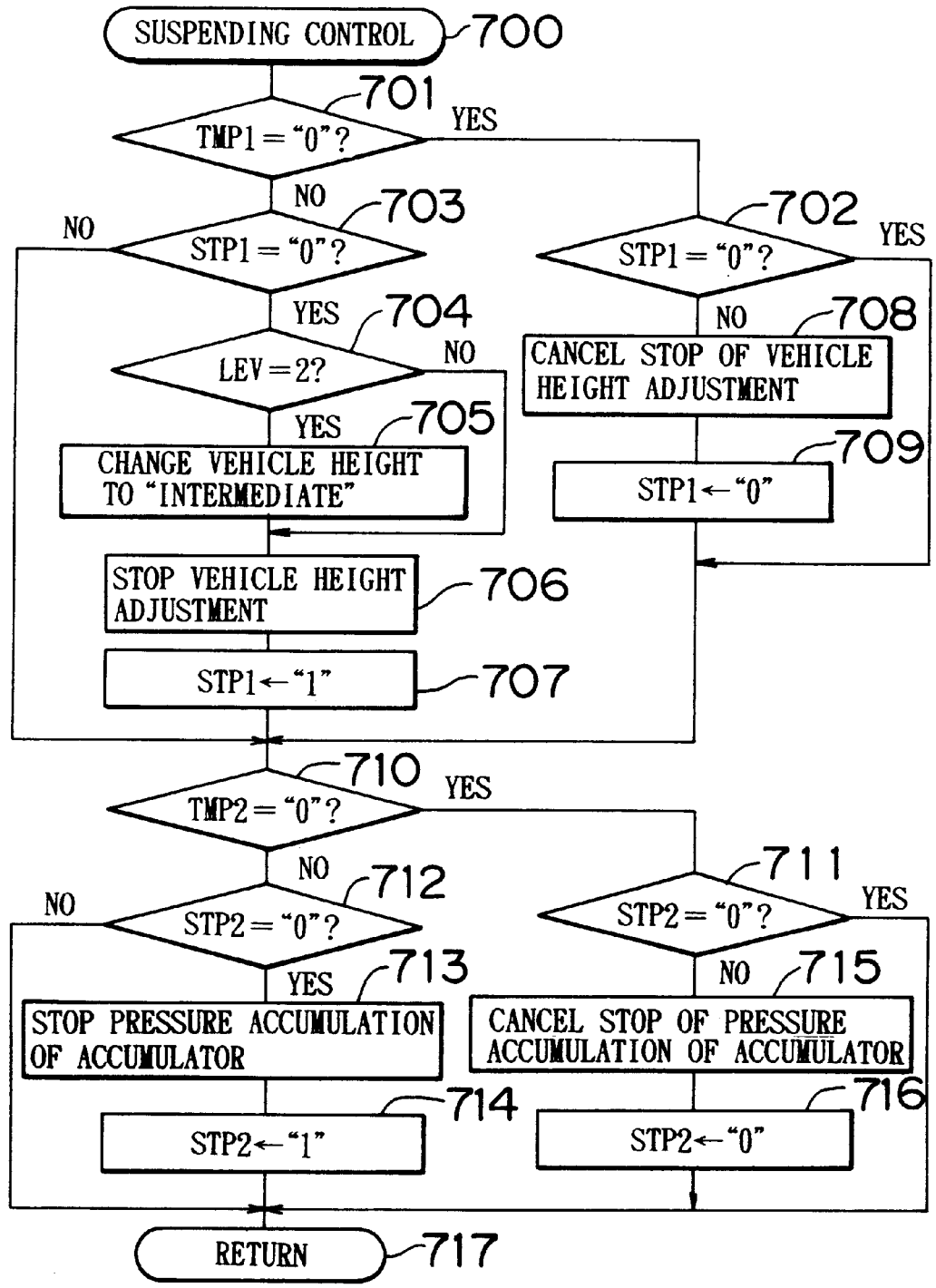
FIG. 10 is a flowchart illustrating in detail the suspending control routine indicated in FIG. 2.

The suspending control routine of step 124 in the main program of FIG. 2 is illustrated in detail in FIG. 10. When the suspending control routine is started in step 700, the microcomputer 30 determines in step 701 whether the first temperature condition flag TMP1 is "0". If the first temperature condition flag TMP1 is "0", the microcomputer 30 makes an affirmative determination (YES) in step 701, and then determines in step 702 whether the first suspension flag STP1 is "0". The first suspension flag STP1 indicates by "1" that the vehicle height adjustment is suspended. The first suspension flag STP1 is initially set to "0". In this case, therefore, the microcomputer 30 makes an affirmative determination (YES) in step 702, and proceeds to step 710. If the first suspension flag STP1 is "0", the microcomputer 30 makes an affirmative determination (YES) in step 110 in the main program of FIG. 2, so that the process of steps 110 through 120, that is, the vehicle height adjusting operation, is allowed.

If the fluid temperature T becomes very low or very high so that the first temperature condition flag TMP1 is set to "1", the microcomputer 30 makes a negative determination (NO) in step 701, and proceeds to step 703. In step 703, it is determined whether the first suspension flag STP1 is "0". Since the first suspension flag STP1 is initially set to "0" as mentioned above, the microcomputer 30 initially makes an affirmative determination (YES) in step 703, and then determines in step 704 whether the level data LEV is 2. If the level data LEV is 2, the microcomputer 30 makes an affirmative determination (YES) in step 704, and executes step 705.

Step 705 is a step for setting the target vehicle heights Hf*, Hr* of the front and rear portions of vehicle back to the INTERMEDIATE state if they have been set to the HIGH state. In step 705, the microcomputer 30 changes the level data LEV to 1, and sets each of the target vehicle heights Hf*, Hr* to a value corresponding to the changed level data LEV (that is, 1). Then, the leveling valves 24a, 24b are energized to switch them to the open state, so that the font and rear portions of the vehicle body 10 are lowered. When the vehicle heights Hf, Hr of the front and rear portions become substantially equal to the target vehicle heights Hf*, Hr*, the leveling valves 24a, 24b are switched to the closed state, thereby ending the vehicle height lowering control. If the electric motor 21 and the hydraulic pump 22 are in operation, the electric motor 21 and the hydraulic pump 22 are stopped. If the accumulator valve 26 is in the open state, the accumulator valve 26 is switched to the closed state. Therefore, when the vehicle height adjustment is suspended, the vehicle height is maintained at not the HIGH state but the INTERMEDIATE state, so that good driving stability of the vehicle is ensured.

After executing steps 704, 705, the microcomputer 30 stops the electric motor 21 and the hydraulic pump 22 in step 706 if they are in operation. Furthermore, in step 706, the leveling valves 24a, 24b and the accumulator valve 26 are switched to the closed state if they are in the open state. Subsequently, the microcomputer 30 sets the first suspension flag STP1 to "1" in step 707, and then proceeds to step 710. Therefore, the next time the main program of FIG. 2 is executed, the microcomputer 30 makes a negative determination (NO) in step 110, and therefore skips the process of steps 112 through 120. The vehicle height adjustment is thus suspended. In step 706 of the suspending control routine, the front raising flag FU, the front lowering flag FD, the rear raising flag RU and the rear lowering flag RD are maintained as they have been set, so as to resume the vehicle height adjustment after the suspension.

When, during the suspension of the vehicle height adjustment as described above, the fluid temperature T increases or decreases so that the first temperature condition flag TMP1 is set back to "0", the microcomputer 30 makes an affirmative determination (YES) in step 701, and then proceeds to step 702. In this case, the first suspension flag STP1 is still at "1", the microcomputer 30 makes a negative determination (NO) in step 702, and then executes step 708. Step 708 is a step for restarting the vehicle height adjustment from a suspension. In step 708, the operation of the electric motor 21 and the hydraulic pump 22 is restarted if the front raising flag FU or the rear raising flag RU is "1".

Furthermore, if the front raising flag FU or the front lowering flag FD is "1", the leveling valve 24a is switched to the open state. If the rear raising flag RU or the rear lowering flag RD is "1", the leveling valve 24b is switched to the open state. If the flags FU, FD, RU, RD are "0", the microcomputer 30 refrains from operating the electric motor 21 and the hydraulic pump 22, and from switching the leveling valves 24a, 24b to the open state. Subsequently in step 709, the microcomputer 30 sets the first suspension flag STP1 back to "0", and proceeds to step 710. By this operation, the control of raising or lowering the front or rear portion of the vehicle body 10 is restarted. Furthermore, an affirmative determination (YES) is made in step 110 of the main program of FIG. 2, so that the vehicle height adjustment control of steps 112 through 120 is restarted.

By the process of steps 701 through 709, the vehicle height adjustment control is suspended if the fluid temperature T becomes equal to or lower than the predetermined temperature T1 or equal to or higher than the predetermined temperature T4. The suspended vehicle height adjustment is restarted when the fluid temperature T becomes equal to or higher than the predetermined temperature T2 or equal to or lower than the predetermined temperature T3. Therefore, if the fluid temperature T becomes very low or very high so that the viscosity of the hydraulic fluid becomes very high or very low, or so that the fluidity of the hydraulic fluid becomes very low or very high, the operation of the hydraulic pump 22 is stopped. In this manner, the durability or service life of the various components of the hydraulic system, including the hydraulic pump 22, the valves 24a, 24b, 26 and the like, is increased.

In step 710 of the suspending control routine, the microcomputer 30 determines whether the second temperature condition flag TMP2 is "0". If the second temperature condition flag TMP2 is "0", the microcomputer 30 makes an affirmative determination (YES) in step 710, and then determines in step 711 whether a second suspension flag STP2 is "0". The second suspension flag STP2 indicates by "1" that the hydraulic fluid supply/discharge operation for the accumulator 25 is suspended. The second suspension flag STP2 is initially set to "0". Therefore, in this case, the microcomputer 30 makes an affirmative determination (YES) in step 711, and ends the execution of the suspending control routine in step 717. Therefore, the next time the main program of FIG. 2 is executed, the microcomputer 30 makes an affirmative determination (YES) in step 106, so that the accumulator control routine of step 108, that is, the hydraulic fluid supply/discharge operation for the accumulator 25, is allowed.

When the fluid temperature T increases or decreases to an extent such that the second temperature condition flag TMP2 is set to "1", the microcomputer 30 makes a negative determination (NO) in step 710, and proceeds to step 712. In step 712, it is determined whether the second suspension flag STP2 is "0". Since the second suspension flag STP2 is initially set to "0" as mentioned above, the microcomputer 30 makes an affirmative determination (YES) in step 712, and then executes step 713. In step 713, the operation of the electric motor 21 and the hydraulic pump 22 is stopped if they are in operation. At the same time, the accumulator valve 26 is switched to the closed state if it is in the open state. Subsequently, the microcomputer 30 sets the second suspension flag STP2 to "1" in step 714, and ends the execution of the suspending control routine in step 717. Therefore, the next time the main program of FIG. 2 is executed, the microcomputer 30 makes a negative determination (NO) in step 106, so that accumulator control routine of step 108 is skipped. The hydraulic fluid supply/discharge operation for the accumulator 25 is thus suspended. In step 713 of the suspending control routine, the accumulator flag AF is maintained as it has been set, so as to resume the hydraulic fluid supply/discharge operation for the accumulator 25 after the suspension.

When, during the suspension of the control of the accumulator 25 as described above, the fluid temperature T increases or decreases so that the second temperature condition flag TMP2 is set back to "0", the microcomputer 30 makes an affirmative determination (YES) in step 710, and then proceeds to step 711. In this case, the second suspension flag STP2 is still at "1", the microcomputer 30 makes a negative determination (NO) in step 711, and then executes step 715. Step 715 is a step for restarting the hydraulic fluid supply/discharge operation for the accumulator 25 from a suspension. In step 715, the operation of the electric motor 21 and the hydraulic pump 22 is restarted and the accumulator valve 26 is switched to the open state, if the accumulator flag AF is "1". If the accumulator flag AF is "0", the microcomputer 30 refrains from operating the electric motor 21 and the hydraulic pump 22, and from switching the accumulator valve 26 to the open state. Subsequently in step 716, the microcomputer 30 sets the second suspension flag STP2 back to "0", and ends the execution of the suspending control routine in step 717. By this operation, the control of the hydraulic fluid supply/discharge operation for the accumulator 25 is restarted. Furthermore, an affirmative determination (YES) is made in step 106 of the main program of FIG. 2, so that the accumulator control routine of step 108 is restarted.

By the process of steps 710 through 716, the control of the accumulator 25 is suspended if the fluid temperature T becomes equal to or lower than the predetermined temperature T5 or equal to or higher than the predetermined temperature T8. The suspended control of the accumulator 25 is restarted when the fluid temperature T becomes equal to or higher than the predetermined temperature T6 or equal to or lower than the predetermined temperature T7. Therefore, if the fluid temperature T decreases or increases to an extent such that the viscosity of the hydraulic fluid becomes quite high or quite low, or so that the fluidity of the hydraulic fluid becomes quite low or quite high, the operation of the hydraulic pump 22 is stopped. In this manner, the durability or service life of the various components of the hydraulic system, including the hydraulic pump 22, the accumulator 25 and the like, is increased.

The delay control and the duty ratio control as described above may also be performed for the control of the operation of the hydraulic pump 22 and the control of the switching of the valves 24a, 24b, 26

In the fluid temperature determining routine and the suspending control routine according the aforementioned embodiment, if the fluid temperature T becomes equal to or lower than the predetermined temperature T1 or T5 or becomes equal to or higher than the predetermined temperature T4 or T8, the first or second temperature condition flag TMP1, TMP2 is set to "1" so as to suspend the vehicle height adjustment control or the control of the accumulator 25. However, this manner of the suspending control may be modified. For example, in a case where a type of hydraulic fluid is used which does not undergo significant viscosity reduction nor significant fluidity increase if the fluid temperature T increases, or in a case where there is substantially no possibility that the fluid temperature T will become equal to or higher than the predetermined temperature T4 or T8, it is possible to simplify the suspending control program so that only when the fluid temperature T becomes equal to or lower than the predetermined temperature T1 or T5, the first or second temperature condition flag TMP1, TMP2 is set to "1" to suspend the vehicle height adjustment control or the control of the accumulator 25. Furthermore, in a case, for example, where a type of hydraulic fluid is used which does not undergo significant viscosity increase nor significant fluidity reduction if the fluid temperature T decreases, or where there is substantially no possibility that the fluid temperature T will become equal to or lower than the predetermined temperature T1 or T5, the suspending control program may also be simplified so that only when the fluid temperature T becomes equal to or higher than the predetermined temperature T4 or T8, the first or second temperature condition flag TMP1, TMP2 is set to "1" to suspend the vehicle height adjustment control or the control of the accumulator 25.

Although in the foregoing embodiment, two vehicle height sensors 33a, 33b are provided in the front portion of the vehicle body 10, and one vehicle height sensor 33c is provided in the rear portion thereof, it is also possible to provide one vehicle height sensor in each of the front portion and the rear portion of the vehicle body 10 so as to detect the actual vehicle heights Hf, Hr of the front and rear portions thereof. It is also possible to provide one vehicle height sensor at each of the positions corresponding to the left and right rear wheels W3, W4 and detect the vehicle height of the rear portion of the vehicle body 10 by averaging the vehicle heights detected by the sensors.

Although in the foregoing embodiment, the invention is applied to a vehicle height adjust control apparatus that raises or lowers the front portion and the rear portion of the vehicle body 10 separately or simultaneously, the invention may also be applied to a vehicle height adjust control apparatus that raises or lowers the vehicle body 10 separately for the positions corresponding to the wheels W1–W4, or raises or lowers the entire vehicle body 10 simultaneously at all the positions. It is also possible to apply the invention to a vehicle height adjust control apparatus that raises or lowers the right portion and the left portion of the vehicle body 10 separately or simultaneously. In such control apparatus, the supply and discharge of hydraulic fluid with respect to the hydraulic cylinders 11a–11d disposed at positions corresponding to the wheels W1–W4 may be controlled separately for each of the positions or separately for the left and right positions.

While the present invention has been described with reference to what is presently considered to be preferred embodiments thereof, it is to be understood that the invention is not limited to the disclosed embodiments. To the contrary, the invention is intended to cover various modifications and equivalent arrangements.

What is claimed is:

1. A vehicle height adjust control apparatus comprising:
   a hydraulic actuator that increases and decreases a vehicle height using hydraulic fluid;

a hydraulic pump that ejects the hydraulic fluid;

a control valve provided in a fluid passage between the hydraulic pump and the hydraulic actuator that opens and closes the fluid passage;

a vehicle height detector that detects a vehicle height;

supply/discharge control means for controlling operation of the hydraulic pump and the opening and closing of the control valve so as to eliminate a deviation of the vehicle height detected by the vehicle height detector from a predetermined target vehicle height; and delay control means provided in the supply/discharge control means for outputting an instruction to switch the control valve from an open state to a closed state at the lapse of a predetermined delay time following output of an instruction by the supply/discharge control means to switch the hydraulic pump from an operating state to a stopped state.

2. A vehicle height adjust control apparatus according to claim 1, further comprising:

a fluid temperature detector that detects a temperature of the hydraulic fluid; and delay time correction means provided in the supply/discharge control means for increasing the predetermined delay time upon detection of a decrease in the temperature of the hydraulic fluid by the fluid temperature detector.

3. A vehicle height adjust control apparatus according to claim 1, further comprising:

a hydraulic pressure detector that detects a pressure of the hydraulic fluid supplied from the hydraulic pump to the hydraulic actuator; and delay time correction means provided in the supply/discharge control means for increasing the predetermined delay time upon detection of an increase in the pressure of the hydraulic fluid detected by the hydraulic pressure detector.

4. A vehicle height adjust control apparatus comprising:

a hydraulic actuator that increases and decreases a vehicle height using hydraulic fluid;

supply/discharge means for enabling supply of the hydraulic fluid to the hydraulic actuator and discharge of the hydraulic fluid from the hydraulic actuator, the supply/discharge means having an electromagnetic on-off valve that controls passage of the hydraulic fluid;

a vehicle height detector that detects a vehicle height;

supply/discharge control means for controlling operation of the supply/discharge means so as to eliminate a deviation of the vehicle height detected by the vehicle height detector from a predetermined target vehicle height; and duty ratio control means provided in the supply/discharge control means for controlling a duty ratio of the supply/discharge control means, wherein the duty ratio control means sets the duty ratio of voltage applied to the electromagnetic on-off valve immediately after voltage application thereto is started to a ratio that is greater than a subsequent applied duty ratio of voltage.

5. A method of adjusting vehicle height, comprising:

providing a hydraulic actuator that increases and decreases a vehicle height using hydraulic fluid;

providing a hydraulic pump that ejects the hydraulic fluid into the hydraulic actuator;

providing a control valve in a fluid passage between the hydraulic pump and the hydraulic actuator that opens and closes the fluid passage;

detecting a vehicle height;

controlling operation of the hydraulic pump and the opening and closing of the control valve so as to eliminate a deviation of the detected vehicle height from a predetermined target vehicle height; and delaying the switching of the control valve from an open state to a closed state until after lapse of a predetermined delay time following an instruction to switch the hydraulic pump from an operating state to a stopped state.

6. A vehicle height adjust control apparatus comprising:

a hydraulic actuator that increases and decreases a vehicle height using hydraulic fluid;

supply/discharge means for enabling supply of the hydraulic fluid to the hydraulic actuator and discharge of the hydraulic fluid from the hydraulic actuator, the supply/discharge means having an electromagnetic on-off valve that controls passage of the hydraulic fluid;

a vehicle height detector that detects a vehicle height;

supply/discharge control means for controlling operation of the supply/discharge means so as to eliminate a deviation of the vehicle height detected by the vehicle height detector from a predetermined target vehicle height; and duty ratio control means provided in the supply/discharge control means for controlling a duty ratio of the supply/discharge control means, wherein the duty ratio control means increases the duty ratio of voltage applied to the electromagnetic on-off valve when an output voltage of a battery provided for applying voltage to the electromagnetic on-off valve is decreased.

7. A vehicle height adjust control apparatus comprising:

a hydraulic actuator that increases and decreases a vehicle height using hydraulic fluid;

supply/discharge means for enabling supply of the hydraulic fluid to the hydraulic actuator and discharge of the hydraulic fluid from the hydraulic actuator, the supply/discharge means having an electromagnetic on-off valve that controls passage of the hydraulic fluid;

a vehicle height detector that detects a vehicle height;

supply/discharge control means for controlling operation of the supply/discharge means so as to eliminate a deviation of the vehicle height detected by the vehicle height detector from a predetermined target vehicle height;

a fluid temperature detector that detects a temperature of the hydraulic fluid; and duty ratio control means provided in the supply/discharge control means for controlling a duty ratio of the supply/discharge control means, the duty ratio control means increasing the duty ratio of voltage applied to the electromagnetic on-off valve with detection of an increase in the temperature of the hydraulic fluid detected by the fluid temperature detector.

* * * * *